United States Patent
Yatsu

(10) Patent No.: US 9,979,283 B2
(45) Date of Patent: May 22, 2018

(54) DC BOOSTING CIRCUIT WITH AT LEAST ONE ENERGY STORAGE ELEMENT

(71) Applicant: SAMSUNG SDI CO., LTD., Yongin-si, Gyeonggi-do (KR)

(72) Inventor: Makoto Yatsu, Yongin-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 0 days. days.

(21) Appl. No.: 14/933,370

(22) Filed: Nov. 5, 2015

(65) Prior Publication Data

US 2016/0126833 A1  May 5, 2016

(30) Foreign Application Priority Data

Nov. 5, 2014  (JP) .................................. 2014-225521
Aug. 4, 2015  (KR) ......................... 10-2015-0110202

(51) Int. Cl.
  *H02M 3/156* (2006.01)
  *H02M 3/07* (2006.01)
  *H02M 3/158* (2006.01)
  *H02M 1/00* (2006.01)

(52) U.S. Cl.
  CPC ............ *H02M 3/07* (2013.01); *H02M 3/156* (2013.01); *H02M 3/158* (2013.01); *H02M 2001/0064* (2013.01)

(58) Field of Classification Search
  None
  See application file for complete search history.

(56) References Cited

U.S. PATENT DOCUMENTS

| | | | |
|---|---|---|---|
| 6,434,029 B1* | 8/2002 | Cyr .......................... | H02M 1/34 323/222 |
| 2003/0107354 A1* | 6/2003 | Lin ........................... | G05F 1/70 323/222 |
| 2007/0096700 A1* | 5/2007 | Weng .................. | H02M 3/1584 323/222 |
| 2011/0309817 A1 | 12/2011 | Yun et al. | |
| 2014/0313627 A1* | 10/2014 | Li ............................ | H02M 1/34 361/91.5 |
| 2014/0376294 A1* | 12/2014 | Hu ......................... | H02M 7/487 363/131 |
| 2015/0061530 A1* | 3/2015 | Kang .................. | H05B 33/0815 315/221 |

FOREIGN PATENT DOCUMENTS

| | | |
|---|---|---|
| JP | 10-146048 A | 5/1998 |
| JP | 2001-309647 A | 11/2001 |
| KR | 10-2011-0136964 A | 12/2011 |
| KR | 10-2012-0003155 A | 1/2012 |
| KR | 10-2015-0026470 A | 3/2015 |

* cited by examiner

*Primary Examiner* — Jeffrey Gblende
(74) *Attorney, Agent, or Firm* — Lee & Morse, P.C.

(57) ABSTRACT

A DC boosting circuit includes switch connected to a first circuit and a second circuit. The first circuit includes first and second elements, and the second circuit includes the second element and a third element. The first and second elements store energy based on an input voltage when the switch is in a first state. The third element stores energy from the second element when the switch is in the second state. The second circuit outputs a voltage greater than the input voltage, and the first, second, and third elements are reactors or capacitors.

14 Claims, 19 Drawing Sheets

DC BOOSTING CIRCUIT WITH AT LEAST ONE ENERGY STORAGE ELEMENT

CROSS-REFERENCE TO RELATED APPLICATIONS

Japanese Patent Application No. 2014-225521, filed on Nov. 5, 2014, and Korean Patent Application No. 10-2015-0110202, filed on Aug. 4, 2015, and entitled, "DC Boosting Circuit," are incorporated by reference herein in its entirety.

BACKGROUND

1. Field

One or more embodiments described herein relate to a DC boosting circuit.

2. Description of the Related Art

One type of DC boosting circuit (called a boosting chopper circuit) includes a switching element, a diode, and a reactor. Presently, the switching element and diode are designed to have a high-voltage current capacity with a high boosting ratio. This may present problems in terms of size and cost for some applications.

SUMMARY

In accordance with one or more embodiments, a DC boosting circuit includes a first switch having a first end connected to a first node; a first diode has a first end connected to the first node and a second end connected to a second node; a first reactor having a first end connected to the first node and a second end connected to a DC power supply; a first capacitor having a first end connected to the second end of the first switch and a second end connected to the second node; a second diode having a first end connected to the second node and a second end connected to a third node; a third diode having a first end connected to the third node; and a second capacitor having a first end connected to the first node and a second end connected to the third node.

The boosting circuit may include a second switch connected in parallel to the first diode; a third switch connected in parallel to the second diode; and a fourth switch connected in parallel to the third diode. The boosting circuit may include a second reactor between the first end of the first reactor and the first end of the second capacitor. The first and second reactors may be wound around a same iron core.

The boosting circuit may include a plurality of DC boosting circuits that share the first capacitor. The DC boosting circuits may be operated in an interleaving mode. The boosting circuit may include a plurality of DC boosting circuits that share the first capacitor and the second reactor.

In accordance with one or more other embodiments, a boosting circuit includes a first circuit including first element and a second element; a second circuit including the second element and a third element; and a switch connected to the first circuit and the second circuit, wherein the first element and the second element are to store energy based on an input voltage when the switch is in a first state and the third element is to store energy from the second element when the switch is in the second state, wherein the second circuit is to output a voltage greater than the input voltage and wherein each of the first element, the second element, and the third element is a reactor or a capacitor.

The boosting circuit may include a fourth element in the first and second circuits, wherein the fourth element is to store energy from the first element when the switch is in the second state and wherein the fourth element is a capacitor or a reactor. The second element may store energy from the fourth element when the switch is in the first state and may store energy from the first element when the switch is in the second state. The second element may store energy from the first element and the fourth element when the switch is in the second state. The third element may store energy from the second element when the switch is in the second state.

The voltage output from the second circuit may be based on a sum of the energy from the first element and the energy from the fourth element stored in the third element. The switch may be connected to the first element, the second element, the third element, and the fourth element. The boosting circuit may include a fifth element to store energy from the fourth element when the switch is in the first state, wherein the fifth element is a reactor or a capacitor.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
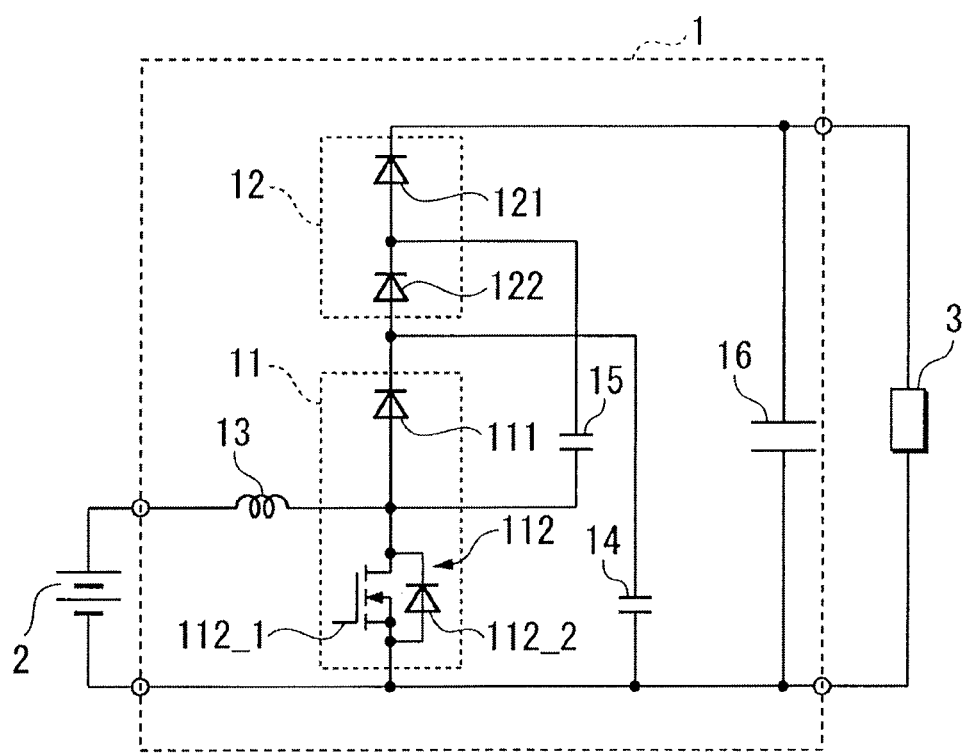
FIG. 1 illustrates an embodiment of a DC boosting circuit.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art. The embodiments may be combined to form additional embodiments.

It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

When an element is referred to as being "connected" or "coupled" to another element, it can be directly connected or coupled to the another element or be indirectly connected or coupled to the another element with one or more intervening elements interposed therebetween. In addition, when an element is referred to as "including" a component, this indicates that the element may further include another component instead of excluding another component unless there is different disclosure.

FIG. 1 illustrates an embodiment of a DC boosting circuit 1 which is connected in parallel between a DC power supply 2 and a load 3. The DC boosting circuit 1 includes a first arm pair 11, a second arm pair 12, a reactor 13, and capacitors 14, 15, and 16. The first arm pair 11 includes a semiconductor switch element 112 (first semiconductor switch element) and a diode 111 (first diode). The semiconductor switch element 112 includes a switch element 112_1 and a diode 112_2. For example, the switch element 112_1 may be a bipolar transistor, a Metal-Oxide-Semiconductor Field-Effect Transistor (MOSFET), an Insulated Gate Bipolar Transistor (IGBT), or the like.

The switch element 112_1 is connected in parallel to the diode 112_2. The switch element 112_1 has one end connected to an anode of the diode 111 and another end connected to a negative terminal of the DC power supply 2. For example, the switch element 112_1 has one end that serves as a drain, another end that serves as a source, and a control terminal that serves as a gate.

The diode 111 has an anode connected to the switch element 112_1 and a cathode connected to one end of the capacitor 14.

The second arm pair 12 includes a diode 121 (third diode) and a diode 122 (second diode). The diode 122 has an anode connected to the cathode of the diode 111 and a cathode connected to an anode of the diode 121. Accordingly, the second arm pair 12 includes a series circuit of the diodes 121 and 122. The diode 121 has a cathode connected to one end of the capacitor 16.

The reactor 13 (first reactor) has one end connected to a positive terminal of the DC power supply 2 and another end connected to a node of the first arm pair 11. The node of the first arm pair 11 is a node of the anode of the diode 111 and one end of the semiconductor switch element 112 (diode 112_2).

The capacitor 14 (first capacitor) is connected in parallel to the first arm pair 11. For example, the capacitor 14 has one end connected to the cathode of the diode 111 and another end connected to one end of the switch element 112_1 and the negative terminal of the DC power supply 2.

The capacitor 15 (second capacitor) has one end connected to a node of the second arm pair 12 and another end connected to the node of the first arm pair 11. The node of the second arm pair 12 is a node of the anode of the diode 121 and the cathode of the diode 122.

The capacitor 16 is connected in parallel to the load 3. The capacitor 16 has one end connected to the cathode of the diode 121 and another end connected to the other end of the switch element 112_1 and the negative terminal of the DC power supply 2.

Figure 2A:
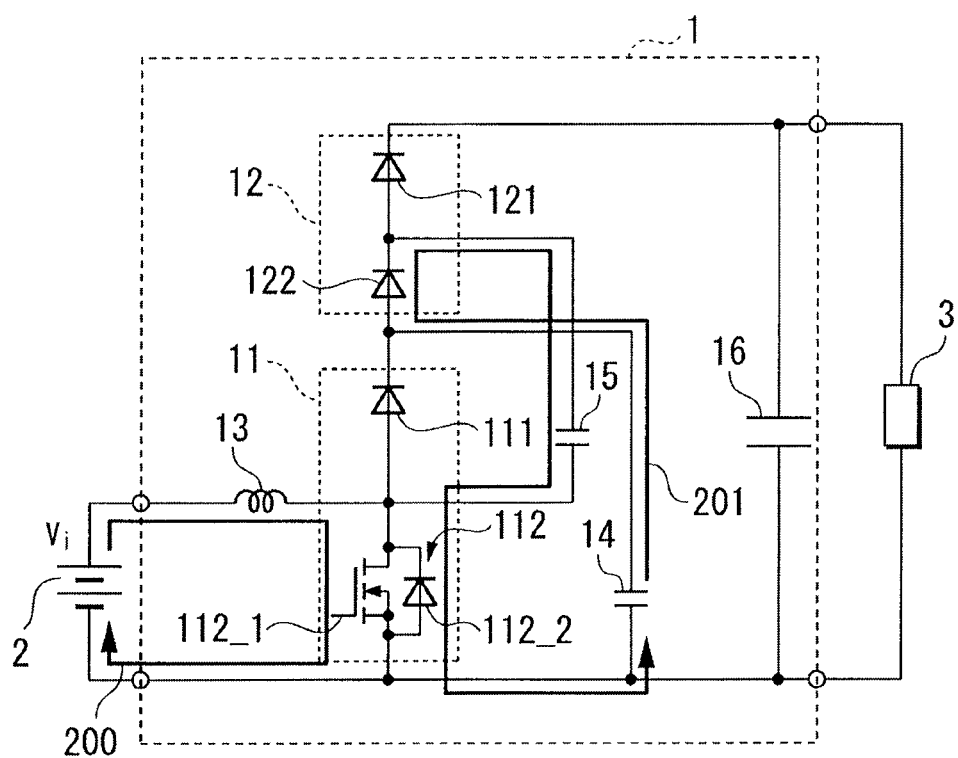
FIGS. 2A and 2B illustrate an example of a boosting operation.
Figure 2B:
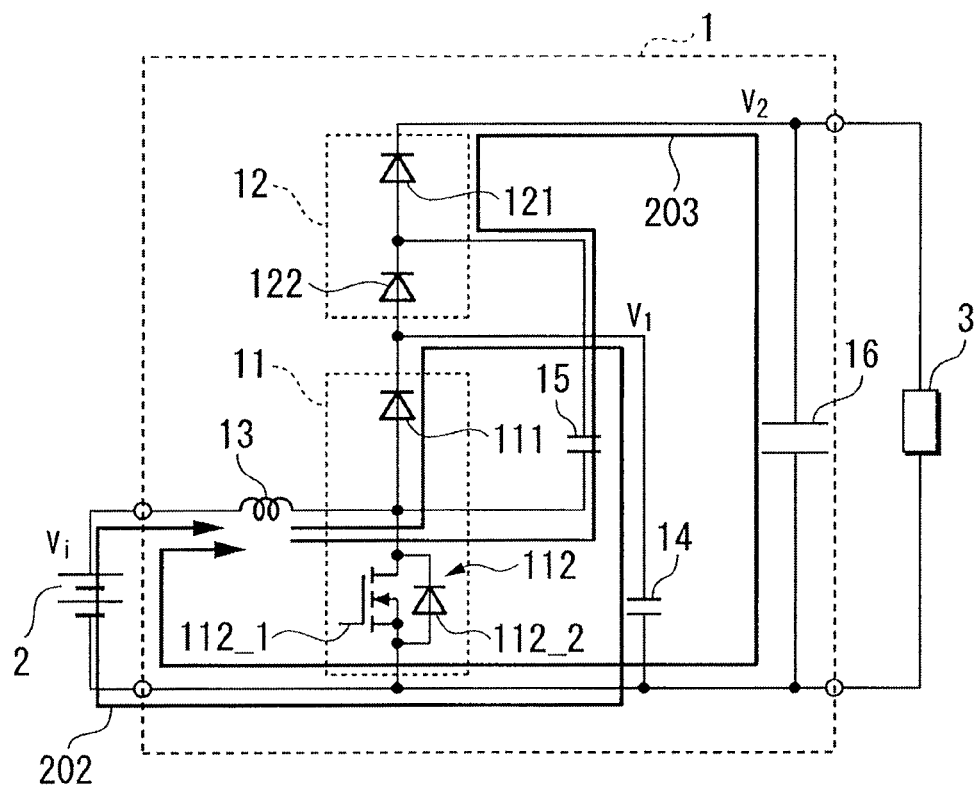

FIGS. 2A and 2B illustrate an example of a boosting operation of the DC boosting circuit 1. In this example, an output voltage of the DC power supply 2 is represented by $V_i$.

FIG. 2A illustrates a current path of the DC boosting circuit 1 when the switch element 112_1 is in an ON state. As shown in FIG. 2A, when the switch element 112_1 is in the ON state, a current $I_i$ supplied by the DC power supply 2 flows along a path 200 including the DC power supply 2, the reactor 13, the switch element 112_1, and the DC power supply 2. In this case, energy is accumulated in the reactor 13.

When the switch element 112_1 is turned on, energy accumulated in the capacitor 14 is partially released along a path 201 including the capacitor 14, the diode 122, the capacitor 15, the switch element 112_1, and the capacitor 14. Therefore, when the switch element 112_1 is turned on, the capacitor 15 is charged by the energy accumulated in the capacitor 14 and has the same electrical potential as the capacitor 14.

FIG. 2B illustrates a current path of the DC boosting circuit 1 when the switch element 112_1 is in the OFF state. As shown in FIG. 2B, when the switch element 112_1 is turned off, a current $I_i$ flowing in the reactor 13 flows along a path 202 including the reactor 13, the diode 111, the capacitor 14, the DC power supply 2, and reactor 13. As a result, the capacitor 14 is charged to a voltage $V_1$ that is higher than the voltage $V_i$ of the DC power supply 2, by action of the voltage $V_i$ of the DC power supply 2 and the energy accumulated in the reactor 13.

Also, when the switch element 112_1 is in the OFF state, current flowing through the reactor 13 flows along a path 203 including the reactor 13, the capacitor 15, the diode 121, the capacitor 16, the DC power supply 2, and the reactor 13. Therefore, the capacitor 16 is charged to a voltage $V_2$ that is higher than the voltage $V_1$, by action of the voltage $V_i$ of the DC power supply 2, the accumulated energy of the reactor 13, and charged energy of the capacitor 15. As such, the load 3 may be supplied with a stable high (boosted) voltage by repeating ON and OFF states of the switch element 112_1 with a predetermined time ratio. The voltage $V_2$ of capacitor 16 will now be described.

Voltages of the capacitor 14 and the capacitor 15 vary depending on the conductance (e.g., a duty ratio) of the switch element 112_1. In one embodiment, conductance of the switch element 112_1 may correspond to a ratio of time in the ON state over one period of the ON and OFF states.

When the conductance of the switch element 112_1 is 0.5 (e.g., a PWM signal with a duty ratio of 50% is supplied to the control terminal (gate) of the switch element 112_1), each voltage of the capacitor 14 and the capacitor 15 is about twice as much as the voltage $V_1$ of the DC power supply 2. Accordingly, since the voltage $V_2$ of the capacitor 16 is a serially added voltage of the voltages of the capacitor 14 and the capacitor 15, the voltage $V_2$ of the capacitor 16 is about 4 times higher than the voltage $V_i$ of the DC power supply 2.

In this case, withstand voltages for the diode 111 and the semiconductor switch element 112 constituting the first arm pair 11 are the voltage $V_1$ of the capacitor 14 that is about half of the voltage $V_2$ of the capacitor 16, e.g., the output voltage of the DC boosting circuit 1.

As described above, the DC boosting circuit 1 according to the present exemplary embodiment serves to boost the voltage of the DC power supply 2, by switching of the switch element 112_1, in order to generate a boosted output voltage.

The DC boosting circuit 1 includes the first arm pair 11, the reactor 13, the capacitor 14, the second arm pair 12, and the capacitor 15. The first arm pair 11 includes the switch element 112_1, and the diode 111 connected at the anode thereof to one end of the switch element 112_1 (hereinafter referred to as being de-serially connected).

The reactor 13 has one end connected to the node of the first arm pair 11 and another end connected to the DC power supply 2. The capacitor 14 is connected in parallel to the first arm pair 11. The second arm pair 12 includes a series circuit of the diode 121 and the diode 122 connected in series to one end of the first arm pair 11. The capacitor 15 is connected between the node of the first arm pair 11 and the node of the second arm pair 12. Accordingly, a voltage applied to the first arm pair 11 and the second arm pair 12 may be determined as the voltage $V_2$ of the capacitor 16 that is lower than the output voltage of the DC boosting circuit 1.

Therefore, it may be advantageous that the load of a semiconductor (e.g., a switch element, a diode, or the like) is reduced and an element having a low current capacity and a low withstand voltage may be employed. As a result, downsizing, weight saving, and cost reducing of a device having a high boosting ratio may be achieved.

Further, when a FET is employed as a semiconductor switch element, the ON resistance of the FET increases exponentially as a withstand voltage thereof increases. Thus, power consumption of the FET increases as its withstand voltage increases. Accordingly, leakage current of the DC boosting circuit is limited. Therefore, in the present exemplary embodiment, a semiconductor switch element having a low ON resistance may be employed.

Figure 3:
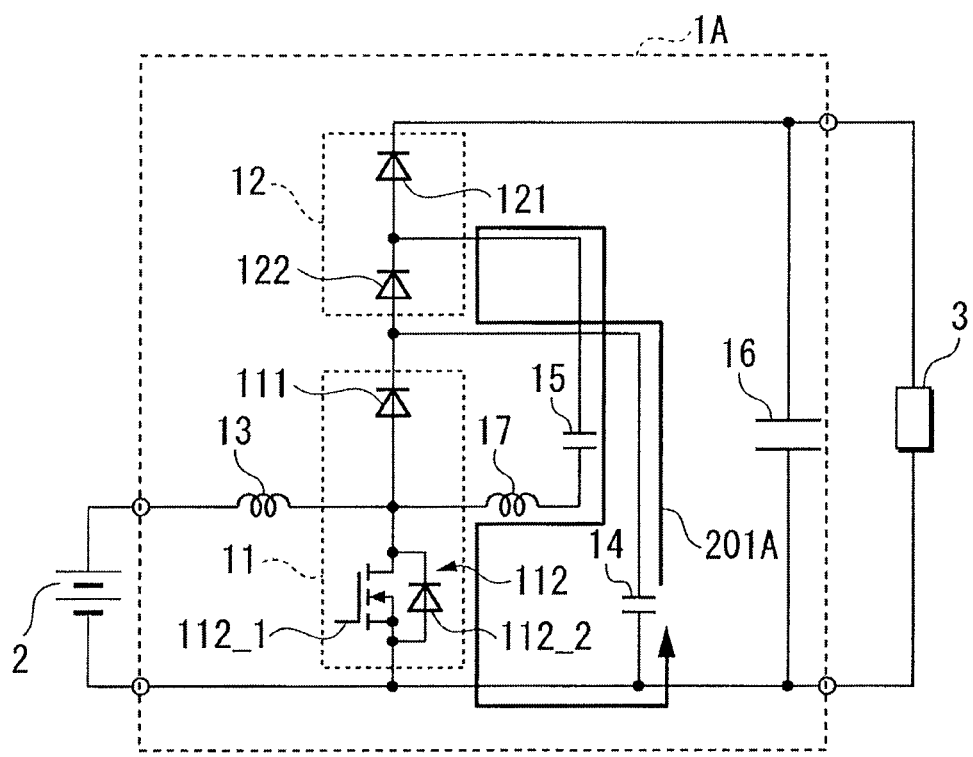
FIG. 3 illustrates another embodiment of a DC boosting circuit.

FIG. 3 illustrates another embodiment of a DC boosting circuit 1A which includes a reactor 17. As shown in FIG. 3, the DC boosting circuit 1A is connected in parallel between the DC power supply 2 and the load 3. The DC boosting circuit 1A includes the first arm pair 11, the second arm pair 12, the reactor 13, the capacitors 14, 15, and 16, and the reactor 17.

The reactor 17 (second reactor) has one end connected to the other end of the capacitor 15 and another end connected to the node of the first arm pair 11. When the switch element 112_1 is in an ON state, the reactor 17 suppresses an inrush current occurring when the capacitor 15 is charged by accumulated energy of the capacitor 14.

When the switch element 112_1 is in the ON state, the reactor 17, the capacitor 14, and the capacitor 15 constitute an LC series resonance circuit, using a path 201A (including the capacitor 14, the diode 122, the capacitor 15, the reactor 17, the switch element 112_1, and the capacitor 14) through which the accumulated energy of the capacitor 14 is released to charge the capacitor 15. Therefore, by appropriately selecting the resonance frequency of the LC series resonance circuit, a reverse recovery operation of the diode 122 may be avoided.

As described above, the DC boosting circuit 1A according to the present exemplary embodiment serves to boost the voltage of the DC power supply 2, by switching the switch element 112_1, in order to generate a boosted output voltage.

The DC boosting circuit 1A includes the first arm pair 11, the reactor 13, the capacitor 14, the second arm pair 12, the capacitor 15, and the reactor 17. The first arm pair 11 includes the switch element 112_1 and the diode 111 de-serially connected to one end of the switch element 112_1. The reactor 13 has one end connected to the node of the first arm pair 11 and another end connected to the DC power supply 2. The capacitor 14 is connected in parallel to the first arm pair 11.

The second arm pair 12 includes a series circuit of the diode 121 and the diode 122 connected in series to one end of the first arm pair 11. The capacitor 15 is connected between the node of the first arm pair 11 and the node of the second arm pair 12. The reactor 17 has one end connected to the other end of the capacitor 15 and another end connected to the node of the first arm pair 11.

Accordingly, a voltage applied to the first arm pair 11 and the second arm pair 12 may be determined as the voltage $V_2$ of the capacitor 16, that is lower than an output voltage of the DC boosting circuit 1A. Therefore, it may be advantageous that the load of a semiconductor (e.g., a switch element, a diode, or the like) is reduced and an element having a low current capacity and a low withstand voltage may be employed. As a result, downsizing, weight saving, and cost reducing of a device having a high boosting ratio may be achieved.

Further, when a FET is employed as a semiconductor switch element, the ON resistance of a FET increases exponentially as its withstand voltage increases. Thus, as the withstand voltage increases, power consumption of the FET problematically increases. Therefore, in the present exemplary embodiment, a semiconductor switch element having a low ON resistance may be employed.

Further, by action of the reactor 17, the DC boosting circuit 1A according to the present exemplary embodiment may suppress an inrush current that may occur when the capacitor 15 is charged by accumulated energy of the capacitor 14, and may also prevent a reverse recovery operation of the diode 122.

Figure 4:
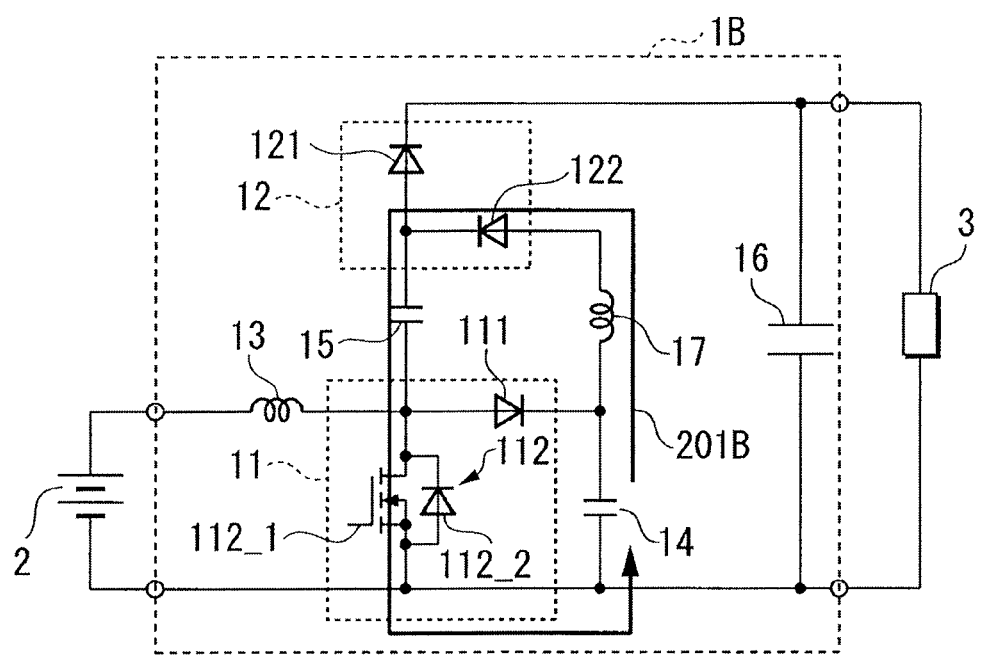
FIG. 4 illustrates another embodiment of a DC boosting circuit.

FIG. 4 illustrates another embodiment a DC boosting circuit 1B which has the reactor 17 at a different location. The DC boosting circuit 1B includes the reactor 17 connected to the node of the cathode of the diode 111, one end of the capacitor 14, and the anode of the diode 122.

As shown in FIG. 4, the DC boosting circuit 1B is connected in parallel between the DC power supply 2 and the load 3. The DC boosting circuit 1B includes the first arm pair 11, the second arm pair 12, the reactor 13, the capacitors 14, 15, and 16, and the reactor 17. The first arm pair 11 includes the semiconductor switch element 112 and the diode 111. The diode 111 has anode connected to one end of the switch element 112_1 and a cathode connected to one end of the capacitor 14 and the other end of reactor 17.

The second arm pair 12 includes the diodes 121 and 122. The diode 122 has an anode connected to one end of the reactor 17 and a cathode connected to the anode of the diode 121. Therefore, the second arm pair 12 includes a series circuit of the diodes 121 and 122.

The cathode of the diode 121 is connected to one end of the capacitor 16. The reactor 17 has one end connected to the anode of the diode 122 and another end thereof connected to the cathode of the diode 111 and the capacitor 14.

When the switch element 112_1 is in an ON state, the reactor 17 suppresses an inrush current occurring when the capacitor 15 is charged by accumulated energy of the capacitor 14. Further, when the switch element 112_1 is in the ON state, the reactor 17, the capacitor 14, and the capacitor 15 constitute an LC series resonance circuit using a path 201B (including the capacitor 14, the reactor 17, the diode 122, the capacitor 15, the switch element 112_1, and the capacitor 14) through which the accumulated energy of the capacitor 14 is released to charge the capacitor 15.

Therefore, by appropriately selecting a resonance frequency of the LC series resonance circuit, a reverse recovery operation of the diode 122 may be avoided.

As described above, the DC boosting circuit 1B serves to boost the voltage of the DC power supply 2, by a switching of the switch element 112_1, in order to generate a boosted output voltage. The DC boosting circuit 1B includes the first arm pair 11, the reactor 13, the capacitor 14, the second arm pair 12, the capacitor 15, and the reactor 17.

The first arm pair 11 includes the switch element 112_1 and the diode 111 de-serially connected to one end of the switch element 112_1. The reactor 13 has one end connected to the node of the first arm pair 11 and another end connected to the DC power supply 2.

The capacitor 14 is connected in parallel to the first arm pair 11. The second arm pair 12 includes a series circuit of the diode 121 and the diode 122 connected in series to one end of the first arm pair 11.

The capacitor 15 is connected between the node of the first arm pair 11 and the node of the second arm pair 12. The reactor 17 has one end connected to the anode of the diode 122 and another end connected to the cathode of the diode 111 and capacitor 14.

Accordingly, a voltage applied to the first arm pair 11 and the second arm pair 12 may be determined as the voltage $V_2$ of the capacitor 16, that is lower than an output voltage of the DC boosting circuit 1B. Therefore, it may be advantageous that the load of a semiconductor (e.g., a switch element, a diode, or the like) is reduced, and an element having a low current capacity and a low withstand voltage may be employed. As a result, downsizing, weight saving, and cost reducing of a device having a high boosting ratio may be achieved.

Further, when a FET is employed as a semiconductor switch element, the ON resistance of a FET increases exponentially as its withstand voltage increases. Thus, power consumption of a FET itself increases as its withstand voltage increases. Accordingly, leakage current of a DC boosting circuit is limited. Therefore, in the present exemplary embodiment, a semiconductor switch element having a low ON resistance may be employed.

Further, by action of the reactor 17, the DC boosting circuit 1B according to the present exemplary embodiment may suppress an inrush current occurring when the capacitor 15 is charged by accumulated energy of the capacitor 14, and may prevent a reverse recovery operation of the diode 122.

Figure 5:
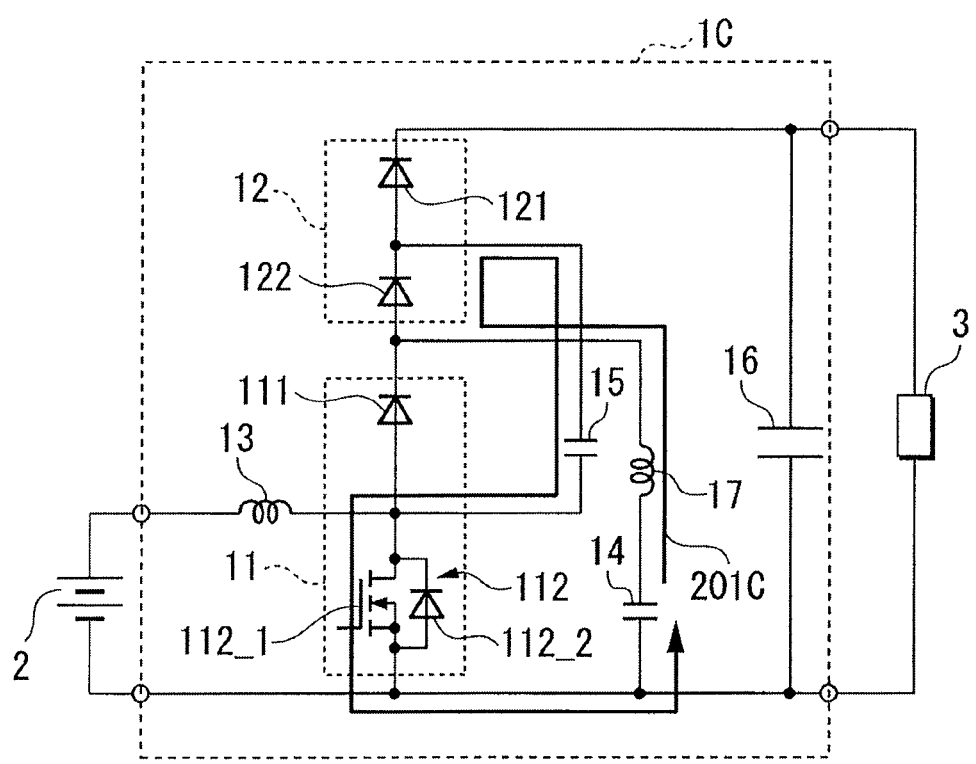
FIG. 5 illustrates another embodiment of a DC boosting circuit.

FIG. 5 illustrates another embodiment of a DC boosting circuit 1C where the reactor 17 is in a different location. The DC boosting circuit 1C includes the reactor 17 interposed between the cathode of the diode 111 and one end of the capacitor 14. As shown in FIG. 5, the DC boosting circuit 1C is connected in parallel between the DC power supply 2 and the load 3.

The DC boosting circuit 1C includes the first arm pair 11, the second arm pair 12, the reactor 13, the capacitors 14, 15, and 16, and the reactor 17. The reactor 17 has one end connected to the cathode of the diode 111 and the anode of the diode 122 and another end connected to one end of the capacitor 14.

The capacitor 14 has one end connected to the other end of the switch element 112_1 and the negative terminal of the DC power supply 2. When the switch element 112_1 is in an ON state, the reactor 17 suppresses an inrush current occurring when the capacitor 15 is charged by accumulated energy of the capacitor 14.

Further, when the switch element 112_1 is in the ON state, the reactor 17, the capacitor 14, and the capacitor 15 constitute an LC series resonance circuit, using a path 201C (including the capacitor 14, the reactor 17, the diode 122, the capacitor 15, the switch element 112_1, and the capacitor 14) through which the accumulated energy of the capacitor 14 is released to charge the capacitor 15.

Therefore, by appropriately selecting a resonance frequency of the LC series resonance circuit, a reverse recovery operation of the diode 122 may be avoided.

As described above, the DC boosting circuit 1C according to the present exemplary embodiment serves to boost the voltage of the DC power supply 2, by a switching of the switch element 112_1, in order to generate a boosted output voltage.

The DC boosting circuit 1C includes the first arm pair 11, the reactor 13, the capacitor 14, the second arm pair 12, the capacitor 15, and the reactor 17. The first arm pair 11 includes the switch element 112_1 and the diode 111 de-serially connected to one end of the switch element 112_1.

The reactor 13 has one terminal connected to the node of the first arm pair 11 and another terminal connected to the DC power supply 2. The capacitor 14 is connected in parallel to the first arm pair 11.

The second arm pair 12 includes a series circuit of the diode 121 and the diode 122 connected in series to one end of the first arm pair 11. The capacitor 15 is connected between the node of the first arm pair 11 and the node of the second arm pair 12. The reactor 17 has one end connected to the cathode of the diode 111 and the anode of the diode 122 and another end connected to one end of the capacitor 14.

Accordingly, a voltage applied to the first arm pair 11 and the second arm pair 12 may be determined as the voltage $V_2$ of the capacitor 16, that is lower than an output voltage of the DC boosting circuit 1C. Therefore, it may be advantageous that the load of a semiconductor (e.g., a switch element, a diode, or the like) is reduced, and an element having a low current capacity and a low withstand voltage may be employed. As a result, downsizing, weight saving, and cost reducing of a device having a high boosting ratio may be achieved.

Further, when a FET is employed as a semiconductor switch element, the ON resistance of a FET increases exponentially as its withstand voltage increases. Thus, power consumption of a FET itself increases as its withstand voltage increases. Accordingly, leakage current of a DC boosting circuit is limited. Therefore, in the present exemplary embodiment, a semiconductor switch element having a low ON resistance may be employed.

Further, by action of the reactor 17, the DC boosting circuit 1C according to the present exemplary embodiment may suppress an inrush current occurring when the capacitor 15 is charged by accumulated energy of the capacitor 14, and may prevent a reverse recovery operation of the diode 122.

Figure 6:
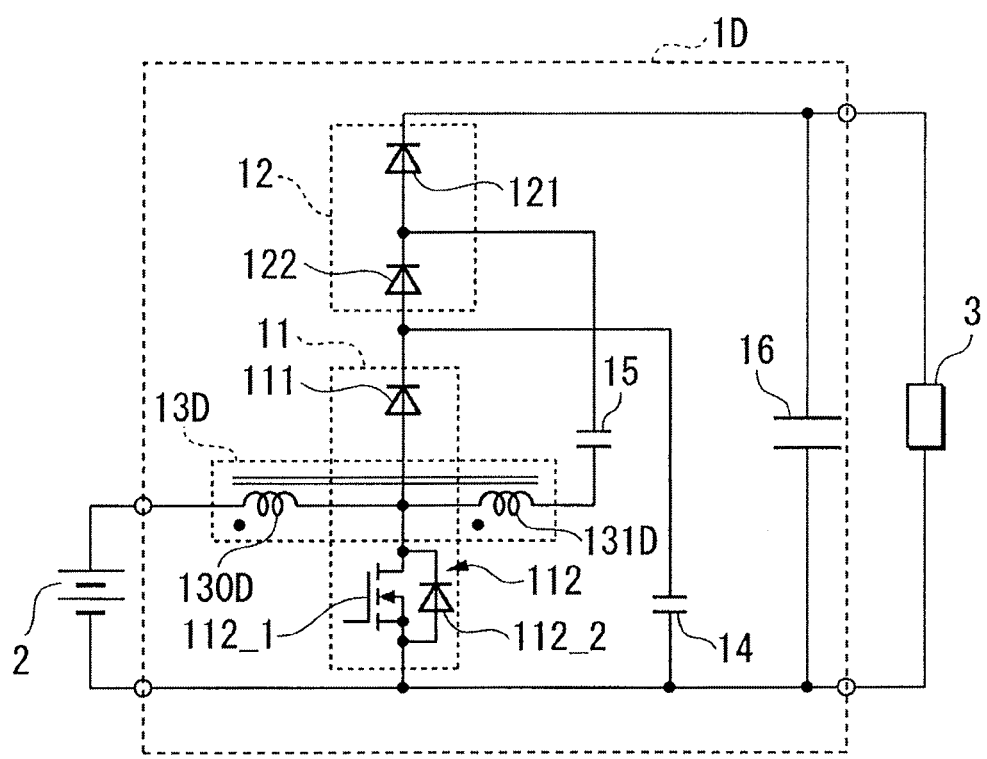
FIG. 6 illustrates another embodiment of a DC boosting circuit.

FIG. 6 illustrates another embodiment of a DC boosting circuit 1D which includes a reactor 13D and a reactor 131D, instead of the reactor 13 and the reactor 17. As shown in FIG. 6, the DC boosting circuit 1D is connected in parallel between the DC power supply 2 and the load 3.

The DC boosting circuit 1D includes the first arm pair 11, the second arm pair 12, the reactor 13D, and the capacitors 14, 15, and 16. As described above, the reactor 13D includes the reactor 130D and the reactor 131D. The reactor 13D includes the reactor 130D and the reactor 131D that share the same iron core therethrough. For example, the reactor 13D may be configured by winding the reactor 130D and the reactor 131D around the same iron core, and magnetically coupling the reactors 130D and 131D to each other.

The reactor 130D has one end connected to the positive terminal of the DC power supply 2 and another end connected to one end of the reactor 131D. The reactor 131D is connected at its other end to the other end of the capacitor 15. Further, a node of the reactor 130D and the reactor 131D is connected to the node of the first arm pair 11.

Figure 7A:
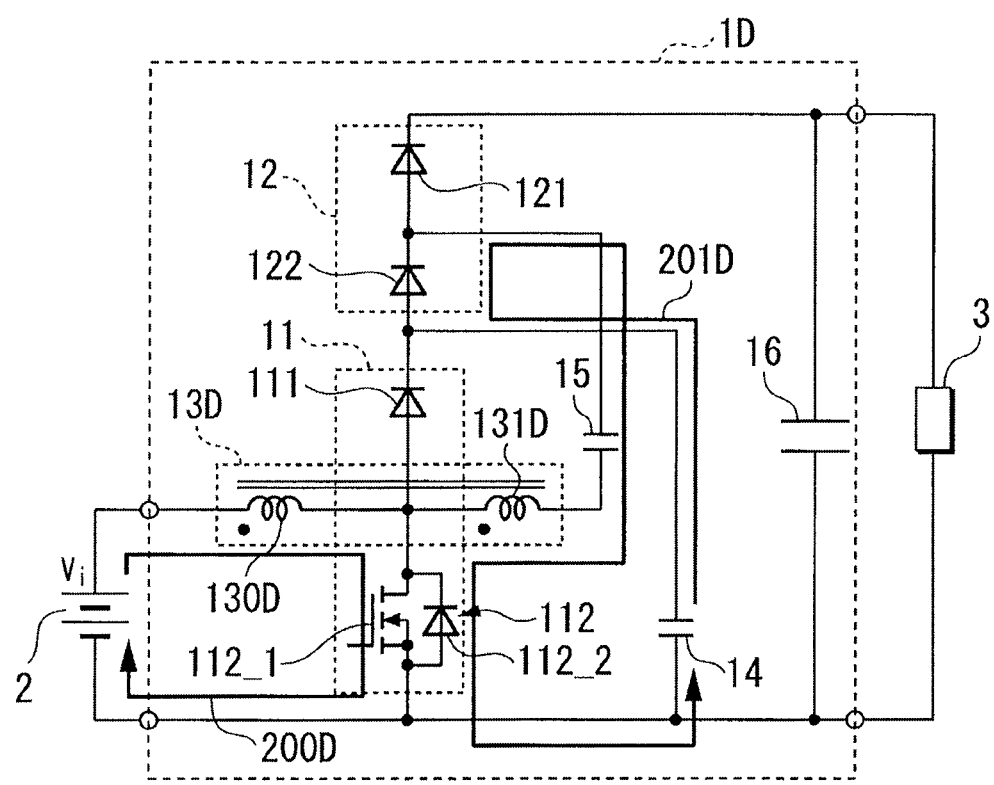
FIGS. 7A and 7B illustrate another example of a boosting operation.
Figure 7B:
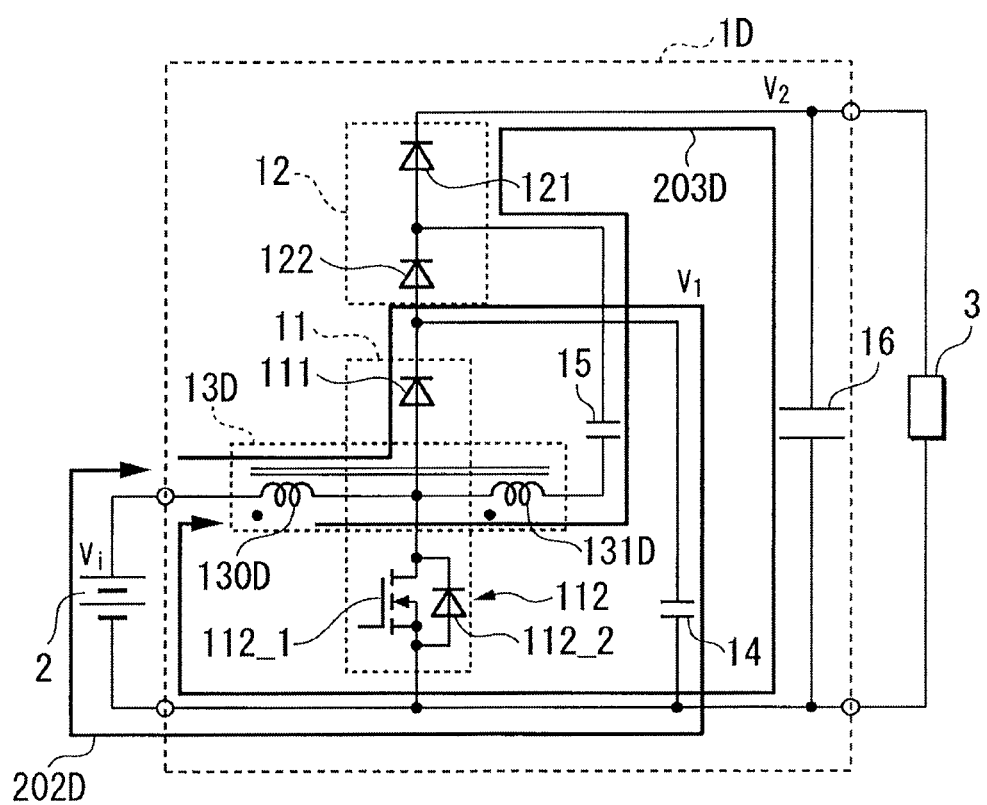

FIG. 7A and FIG. 7B illustrate an example of a boosting operation of the DC boosting circuit 1D. Herein, an output voltage of the DC power supply 2 is represented by $V_i$.

FIG. 7A illustrates a current path of the DC boosting circuit 1D when the switch element 112_1 is in the ON state. As shown in FIG. 7A, when the switch element 112_1 is turned on, a current $I_i$ supplied by the DC power supply 2 flows along a path 200D including the DC power supply 2, the reactor 130D, the switch element 112_1, and the DC power supply 2.

In this case, the reactor 130D is excited to accumulate the excited energy therein and to generate an induced voltage therein. By action of the induced voltage and the voltage of the capacitor 14, a current flows along a path 201D including the capacitor 14, the diode 122, the capacitor 15, the reactor 131D, the switch element 112_1, and the capacitor 14. Further, the capacitor 15 is charged to an added voltage of the induced voltage and the voltage of the capacitor 14.

Accordingly, when the conductance of the switch element 112_1 is the same as in one or more previous embodiments, the DC boosting circuit 1D is charged to as high as a voltage depending on a ratio of the induced voltage of the reactor 131D to the capacitor 15. Next, a boosting operation of the DC boosting circuit 1D, when the switch element 112_1 is in an OFF state, will be described.

FIG. 7B illustrate a current path of the DC boosting circuit 1D when the switch element 112_1 is in the OFF state. As shown in FIG. 7B, when the switch element 112_1 is turned off, a current flowing in the reactor 130D flows along a path 202D including the reactor 130D, the diode 111, the capacitor 14, the DC power supply 2, and the reactor 130D.

In this case, by action of the voltage $V_i$ of the DC power supply 2 and the excited energy accumulated in the reactor 130D, the capacitor 14 is charged to a voltage $V_1$ that is higher than the voltage $V_i$ of the DC power supply 2.

The excited energy of the reactor 130D also flows along a path 203D including the reactors 130D and 131D, the capacitor 15, the diode 121, the capacitor 16, the DC power supply 2, and the reactor 130D. Accordingly, by action of the energies of the DC power supply 2, the reactor 13D, and the capacitor 15, the capacitor 16 is charged to a voltage $V_2$ that is obtained by adding the voltage of the capacitor 14 and the voltage of the capacitor 15.

As such, by repeating ON and OFF states of the switch element 112_1 with a predetermined time ratio, the load 3 may be supplied with a stable high voltage $V_2$. The voltage $V_2$ of the capacitor 16 will now be described.

Voltages of the capacitors 14 and 15 vary depending on the conductance (e.g., a duty ratio) of the switch element 112_1. Further, the voltage of the capacitor 15 varies depending on a winding ratio of the reactor 130D and the reactor 131D. For example, when the conductance is 0.5 and the winding ratio of the reactor 130D and the reactor 131D is 1:1, the voltage of the capacitor 14 is about 2 times higher than the voltage of the DC power supply 2. Meanwhile, the voltage of the capacitor 15 is about 3 times higher than the voltage of the DC power supply 2. Accordingly, since the voltage $V_2$ of the capacitor 16 is the same as a voltage obtained by serially adding the voltages of the capacitors 15 and 14, the voltage $V_2$ of the capacitor 16 is obtained to be about 5 times higher than the voltage of the DC power supply 2.

In this case, withstand voltages for the diode 111 and the semiconductor switch element 112 constituting the first arm pair 11 are supplied from the capacitor 14 that is less than or equal to about a half of the voltage $V_2$ of the capacitor 16, e.g., the output voltage of the DC boosting circuit 1D.

As described above, the DC boosting circuit 1D according to the present exemplary embodiment serves to boost the voltage of the DC power supply 2, by switching of the switch element 112_1, in order to generate a boosted output voltage.

The DC boosting circuit 1D includes the first arm pair 11, the reactor 13D, the capacitor 14, the second arm pair 12, and the capacitor 15. The first arm pair 11 includes the switch element 112_1 and the diode 111 de-serially connected to one end of the switch element 112_1. The reactor 13 has one end connected to the node of the first arm pair 11 and another end connected to the DC power supply 2.

The capacitor 14 is connected in parallel to the first arm pair 11. The second arm pair 12 includes a series circuit of the diode 121 and the diode 122 connected in series to one end of the first arm pair 11. The capacitor 15 is interposed between the node of the first arm pair 11 and the node of the second arm pair 12.

The reactor 13D includes the reactor 130D and the reactor 131D. The reactor 13D includes the reactor 130D and the reactor 131D that share the same iron core therethrough. Accordingly, a voltage applied to the first arm pair 11 and the second arm pair 12 may be determined as the voltage $V_2$ of the capacitor 16 that is lower than the output voltage of the DC boosting circuit 1D.

Therefore, it may be advantageous that the load of a semiconductor (e.g., a switch element, a diode, or the like) is reduced, and an element having a low current capacity and a low withstand voltage may be employed. As a result, downsizing, weight saving, and cost reducing of a device having a high boosting ratio may be achieved.

Further, when a FET is employed as a semiconductor switch element, the ON resistance of a FET increases exponentially as its withstand voltage increases. Thus, power consumption of a FET itself increases as its withstand voltage increases. Accordingly, a leakage current of a DC boosting circuit is limited. Therefore, in the present exemplary embodiment, a semiconductor switch element having low ON resistance may be employed.

Further, by action of the reactor 13D, the DC boosting circuit 1D according to the present exemplary embodiment may suppress an inrush current occurring when the capacitor 15 is charged by accumulated energy of the capacitor 14, and may prevent a reverse recovery operation of the diode 122.

Further, since the DC boosting circuit 1D according to the present exemplary embodiment employs the reactor 13D including the reactor 130D and the reactor 131D that share the same iron core therethrough, more downsizing and weight saving, higher efficiency, and more cost reducing may be achieved compared to one or more previous exemplary embodiments.

Figure 8:
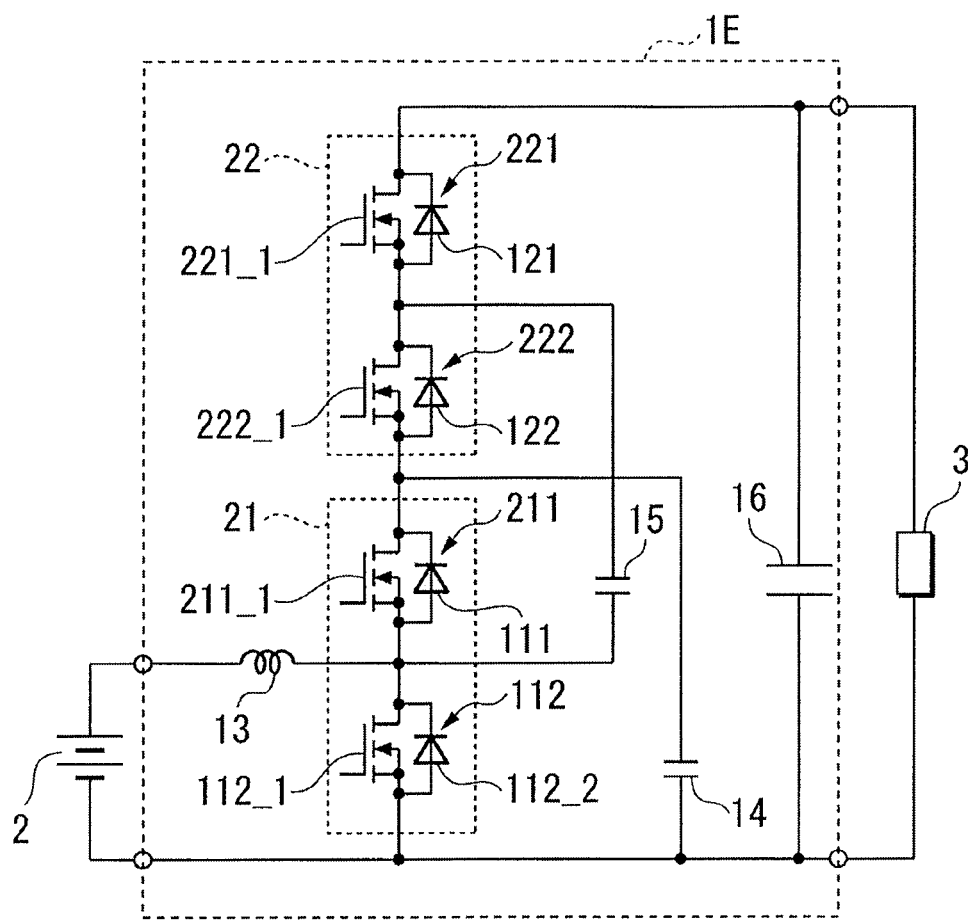
FIG. 8 illustrates another embodiment of a DC boosting circuit.

FIG. 8 illustrates another embodiment of a DC boosting circuit 1E which includes switch elements individually connected in parallel to each of the diodes 111, 121, and 122 of the one or more previous embodiments. As shown in FIG. 8, the DC boosting circuit 1E is connected in parallel between the DC power supply 2 and load 3.

The DC boosting circuit 1E includes the first arm pair 21, the second arm pair 22, the reactor 13, and the capacitors 14, 15, and 16. The first arm pair 21 includes semiconductor switch elements 112 and 211. The semiconductor switch element 211 includes a switch element 211_1 and the diode 111. The switch element 211_1, for example, may be a bipolar transistor, a MOSFET, an IGBT, or the like.

The switch element 211_1 is connected in parallel to the diode 111. The switch element 211_1 is connected at the other end thereof to one end of the switch element 112_1 and the cathode of the diode 112_2. When the switch element 211_1 is an n-type MOSFET, the other end of the switch element 211_1 is a source-side terminal. In this case, one end of the switch element 211_1 is a drain-side terminal. One end of the switch element 211_1 is connected to a second arm pair 22.

The second arm pair 22 includes a semiconductor switch element 221 and a semiconductor switch element 222. The semiconductor switch element 221 includes a switch element 221_1 and the diode 121. The semiconductor switch element 222 includes a switch element 222_1 and the diode 122. For example, the switch element 221_1 and the switch element 222_1 may each be a bipolar transistor, a MOSFET, an IGBT, or the like. The switch element 221_1 is connected in parallel to the diode 121.

The switch element 221_1 has one end connected to one end of the capacitor 16 and has another end connected to one end of the switch element 222_1 and the cathode of the diode 122. For example, one end may serve as a drain terminal, the other end may serve as a source terminal, and a control terminal may serve as a gate terminal.

The switch element 222_1 is connected in parallel to the diode 122. The switch element 222_1 has one end connected to the other end of the switch element 221_1 and another end connected to one end of the switch element 211_1 and the cathode of the diode 111. For example, one end may serve as a drain terminal, the other end may serve as a source terminal, and a control terminal may serve as a gate terminal.

The reactor 13 has one end connected to the positive terminal of the DC power supply 2 and another end connected to the node of the first arm pair 21. The node of the first arm pair 21 is a node of the semiconductor switch elements 211 and 112.

The capacitor 15 has one end connected to the node of the second arm pair 22 and another end connected to the node of the first arm pair 21. The node of the second arm pair 22 is a node of the semiconductor switch elements 221 and 222.

The capacitor 16 is connected in parallel to the load 3. The capacitor 16 has one end connected to the cathode of the diode 121 and another end connected to the other end of the switch element 112_1 and the negative terminal of the DC power supply 2. A boosting operation of the DC boosting circuit 1E may be substantially the same as the boosting operation of one or more of the previous exemplary embodiment.

Figure 9A:
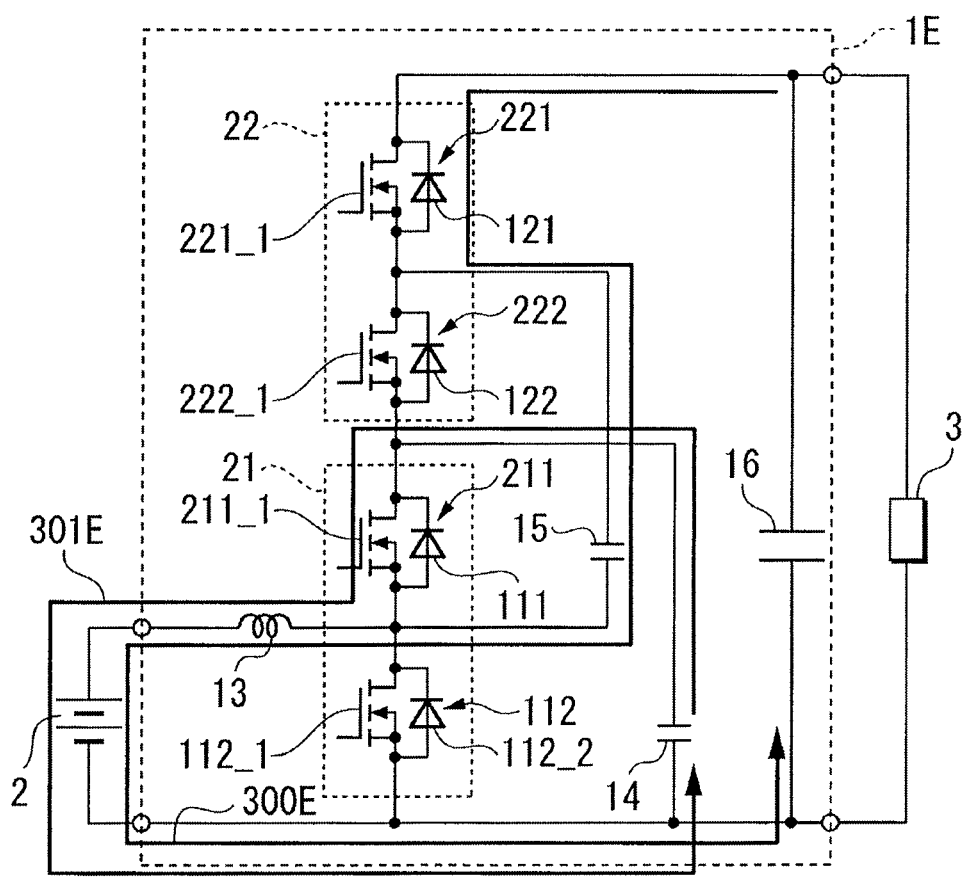
FIGS. 9A and 9B illustrate an example of a regeneration operation.
Figure 9B:
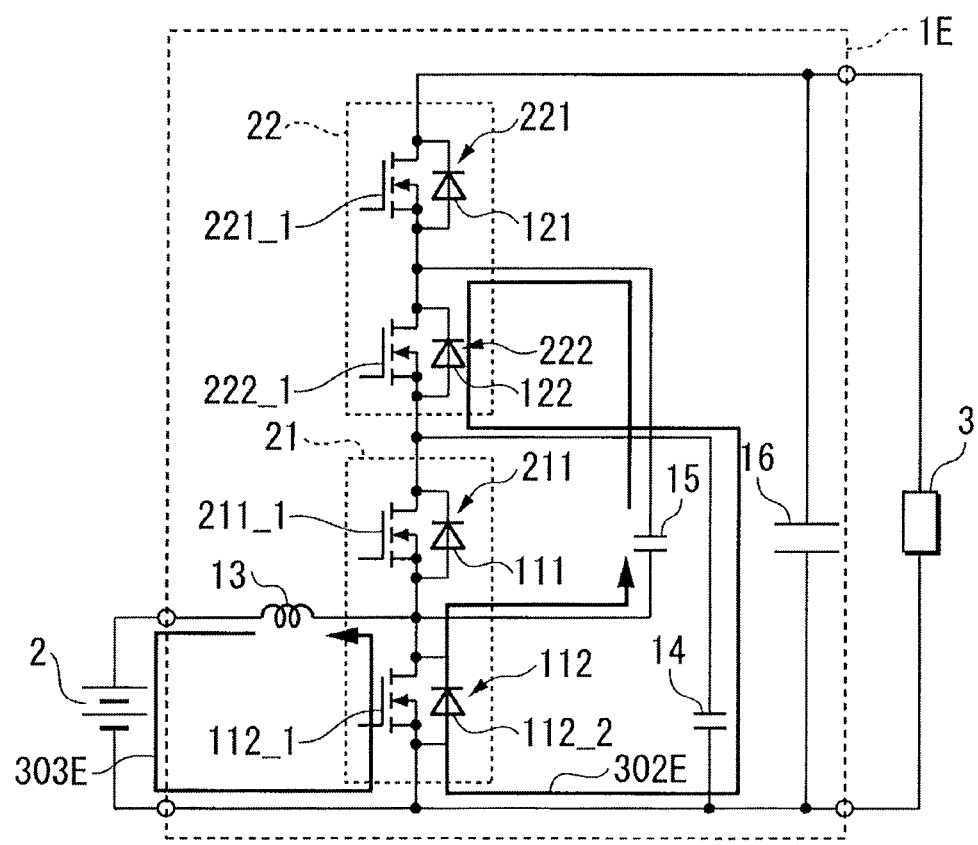

FIGS. 9A and 9B illustrate an example of a regeneration operation of a DC boosting circuit. FIG. 9A illustrates a current path of the DC boosting circuit 1E when the switch element 221_1 and the switch element 211_1 are in an ON state.

First, when the switch element 221_1 and the switch element 211_1 are turned on, a regenerative current from the load 3 flows along a path 300E including the capacitor 16, the switch element 221_1, the capacitor 15, the reactor 13, the DC power supply 2, and the capacitor 16.

Second, the regenerative current, except for a regenerated portion of the DC power supply 2, is mainly accumulated in the capacitor 15 and the reactor 13. In this case, since the switch element 211_1 is also in the ON state, a current flows along a path 301E including the capacitor 14, the switch element 211_1, the reactor 13, the DC power supply 2, and the capacitor 14 by the action of energy of the capacitor 14. Hence, the energy of the capacitor 14 is transferred to the reactor 13 and the DC power supply 2, so the voltage of the capacitor 14 is reduced and the energy thereof also decreases.

FIG. 9B illustrates a current path of the DC boosting circuit 1E when the switch element 211_1 and the switch element 221_1 are in OFF states. The switch element 211_1 and the switch element 221_1 are turned off, and the switch element 222_1 and the switch element 112_1 are turned on. Accordingly, by action of the accumulated energy of the capacitor 15, a current flows along a path 302E including switch element 222_1, the capacitor 14, the switch element 112_1, and the capacitor 15. Thus, the capacitor 14 is charged by the accumulated energy of the capacitor 15, so the voltage thereof is recovered.

Further, by action of the accumulated energy of the reactor 13, a current flows along a path 303E including the DC power supply 2, the switch element 112_1, and the reactor 13, and the accumulated energy of the reactor 13 is regenerated to the DC power supply 2.

A current may be regenerated, from the load 3 having a high voltage to the DC power supply 2 having a low voltage, by repeating ON and OFF states of the switch element 221_1 and the switch element 211_1, and the switch element 222_1 and the switch element 112_1, with a predetermined conductance.

As described above, the DC boosting circuit 1E according to the present exemplary embodiment serves to boost the voltage of the DC power supply 2, by switching of the switch element 112_1, in order to generate a boosted output voltage.

The DC boosting circuit 1E includes the first arm pair 21, the reactor 13, the capacitor 14, the second arm pair 22, and the capacitor 15. The first arm pair 21 includes the semiconductor switch elements 112 and 211. The reactor 13 has one end connected to the node of the first arm pair 21 and another connected to the DC power supply 2. The capacitor 14 is connected in parallel to the first arm pair 21.

The second arm pair 22 includes a series circuit of the semiconductor switch element 221 and the semiconductor switch element 222 connected in series to one end of the first arm pair 21. The capacitor 15 is interposed between the node of the first arm pair 21 and the node of the second arm pair 22. Accordingly, approved voltages of the first arm pair 21 and the second arm pair 22 may be determined as the voltage $V_2$ of the capacitor 16 that is lower than an output voltage of the DC boosting circuit 1E.

Therefore, it may be advantageous that the load of a semiconductor (e.g., a switch element, a diode, or the like) is reduced, and an element having a low current capacity and a low withstand voltage may be employed. As a result, downsizing, weight saving, and cost reducing of a device having a high boosting ratio may be achieved.

Further, when a FET is employed as a semiconductor switch element, the ON resistance of a FET increases exponentially as its withstand voltage increases. Thus, power consumption of the FET increases as its withstand voltage increases. Accordingly, a leakage current of a DC boosting circuit is limited. Therefore, in the present exemplary embodiment, a semiconductor switch element having a low ON resistance may be employed.

Further, as described above, by repeating ON and OFF states of the switch element 221_1 and the switch element 211_1, and the switch element 222_1 and the switch element 112_1, with a predetermined conductance, the DC boosting circuit 1E may regenerate a current from the load 3 having a high voltage to the DC power supply 2 having a low voltage.

Figure 10:
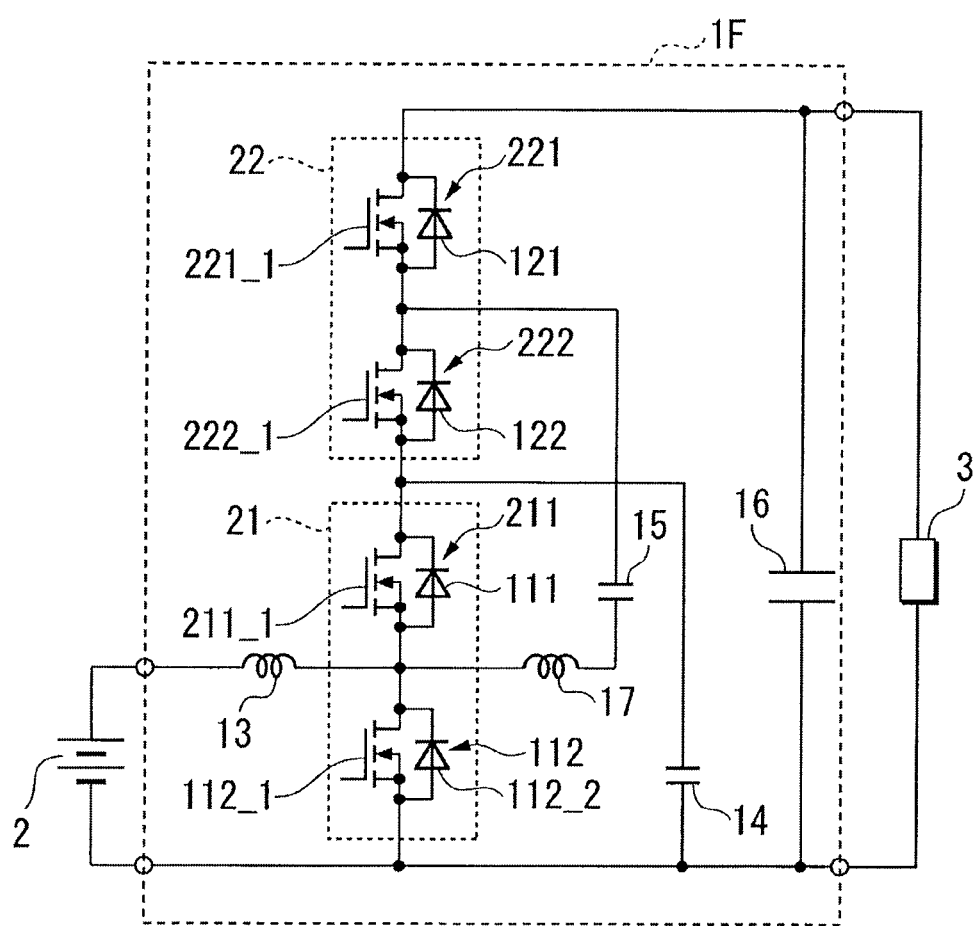
FIG. 10 illustrates another embodiment of a DC boosting circuit.

FIG. 10 illustrates another embodiment of a DC boosting circuit 1F which includes the first arm pair 21, the second arm pair 22, the reactor 13, the capacitors 14, 15, and 16, and the reactor 17. The reactor 17 is interposed between the other end of the capacitor 15 and the node of the first arm pair 21. For example, the reactor 17 has one end connected to one end of the reactor 13 and another end connected to the other end of the capacitor 15.

A boosting operation of the DC boosting circuit 1F may be substantially the same as one or more previous embodiments, and a regenerative operation of the DC boosting circuit 1F may be substantially the same as one or more of the previous embodiments. For example, as described above, the DC boosting circuit 1F according to the present exemplary embodiment serves to boost the voltage of the DC power supply 2, by switching of the switch element 112_1, in order to generate a boosted output voltage.

The DC boosting circuit 1F includes the first arm pair 21, the reactor 13, the capacitor 14, the second arm pair 22, the capacitor 15, and the reactor 17. The first arm pair 21 includes the semiconductor switch elements 112 and 211. The reactor 13 has one end connected to the node of the first arm pair 21 and another end connected to the DC power supply 2. The capacitor 14 is connected in parallel to the first arm pair 21.

The second arm pair 22 includes a series circuit of the semiconductor switch element 221 and the semiconductor switch element 222 connected in series to one end of the first arm pair 21. The capacitor 15 is interposed between the node of the first arm pair 21 and the node of the second arm pair 22. The reactor 17 has one end connected to the other end of the capacitor 15 and another end connected to the node of the first arm pair 21.

Hence, a voltage applied to the first arm pair 21 and the second arm pair 22 may be determined as the voltage $V_2$ of the capacitor 16 that is lower than an output voltage of the DC boosting circuit 1F. Therefore, it may be advantageous that the load of a semiconductor (e.g., a switch element, a diode, or the like) is reduced, and an element having a low current capacity and a low withstand voltage may be employed. As a result, downsizing, weight saving, and cost reducing of a device having a high boosting ratio may be achieved.

Further, when a FET is employed as a semiconductor switch element, ON resistance of a FET increases exponentially as its withstand voltage increases. Thus, power consumption of the FET increases as its withstand voltage increases. Accordingly, a leakage current of a DC boosting circuit is limited. Therefore, in the present exemplary embodiment, a semiconductor switch element having a low ON resistance may be employed.

Further, by action of the reactor 17, the DC boosting circuit 1F according to the present exemplary embodiment may suppress an inrush current occurring when the capacitor 15 is charged by accumulated energy of the capacitor 14, and may prevent a reverse recovery operation of the diode 122.

Further, by repeating ON and OFF states of the switch element 221_1 and the switch element 211_1, and the switch element 222_1 and the switch element 112_1, with a predetermined conductance, the DC boosting circuit 1F according to the present exemplary embodiment may regenerate a current from the load 3 having a high voltage to the DC power supply 2 having a low voltage.

Figure 11:
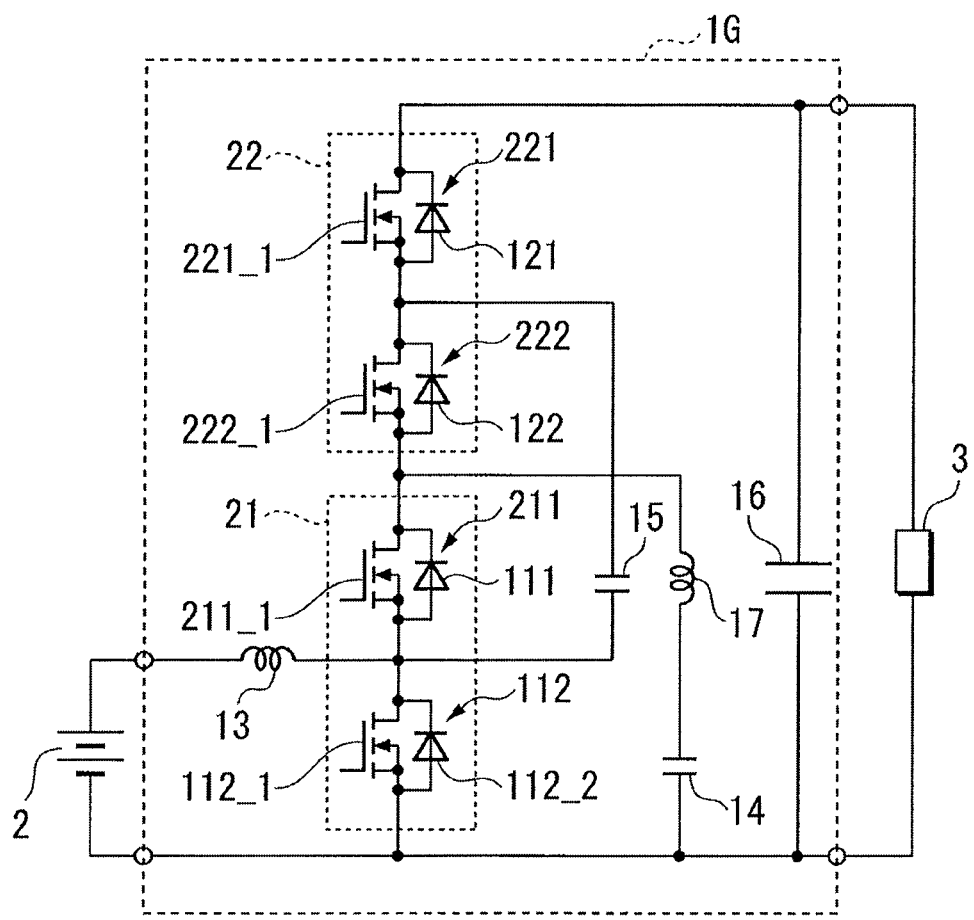
FIG. 11 illustrates another embodiment of a DC boosting circuit.

FIG. 11 illustrates another embodiment of a DC boosting circuit 1G which includes switch elements individually connected in parallel to each of the diodes 111, 121, and 122 one or more previous embodiments. The DC boosting circuit 1G includes the first arm pair 21, the second arm pair 22, the reactor 13, the capacitors 14, 15, and 16, and the reactor 17. The reactor 17 is interposed between the node of the semiconductor switch elements 222 and 211 and one end of the capacitor 14.

A boosting operation of the DC boosting circuit 1G may be substantially the same as one or more previous embodiments. Further, a regenerative operation of the DC boosting circuit 1G may be substantially the same as one or more previous embodiments.

As described above, the DC boosting circuit 1G according to the present exemplary embodiment serves to boost the voltage of the DC power supply 2, by switching of the switch element 112_1, in order to generate a boosted output voltage.

The DC boosting circuit 1G includes the first arm pair 21, the reactor 13, the capacitor 14, the second arm pair 22, the capacitor 15, and the reactor 17. The first arm pair 21 includes the semiconductor switch elements 112 and 211. The reactor 13 has one end connected to the node of the first arm pair 21 and another end connected to the DC power supply 2. The capacitor 14 is connected in parallel to the first arm pair 21.

The second arm pair 22 includes a series circuit of the semiconductor switch element 221 and the semiconductor switch element 222 connected in series to one end of the first arm pair 21. The capacitor 15 is interposed between the node of the first arm pair 21 and the node of the second arm pair 22. The reactor 17 has one end connected to the anode of the diode 122 and at another end connected to the cathode of the diode 111 and the capacitor 14.

Accordingly, a voltage applied to the first arm pair 21 and the second arm pair 22 may be determined as the voltage $V_2$ of the capacitor 16, that is lower than an output voltage of the DC boosting circuit 1G. Therefore, it may be advantageous that the load of a semiconductor (e.g., a switch element, a diode, or the like) is reduced, and an element having a low current capacity and a low withstand voltage may be employed. As a result, downsizing, weight saving, and cost reducing of a device having a high boosting ratio may be achieved.

Further, when a FET is employed as a semiconductor switch element, the ON resistance of a FET increases exponentially as its withstand voltage increases. Thus, power consumption of the FET increases as its withstand voltage increases. Accordingly, a leakage current of a DC boosting circuit is limited. Therefore, in the present exemplary embodiment, a semiconductor switch element having a low ON resistance may be employed.

Further, by action of the reactor 17, the DC boosting circuit 1G according to the present exemplary embodiment may suppress an inrush current occurring when the capacitor 15 is charged by an accumulated energy of the capacitor 14, and may prevent a reverse recovery operation of the diode 122.

Further, by repeating ON and OFF states of the switch element 221_1 and the switch element 211_1, and the switch element 222_1 and the switch element 112_1, with a predetermined conductance, the DC boosting circuit 1G according to the present exemplary embodiment may regenerate a current from the load 3 having a high voltage to the DC power supply 2 having a low voltage.

Figure 12:
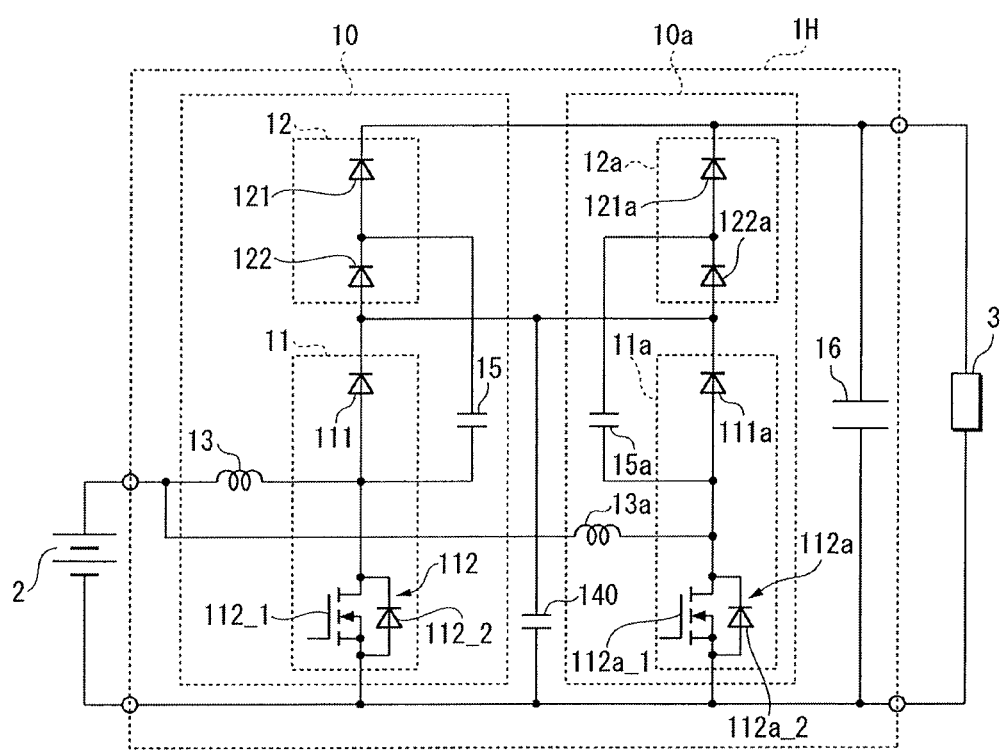
FIG. 12 illustrates another embodiment of a DC boosting circuit.

FIG. 12 illustrates another embodiment of a DC boosting circuit 1H which includes two DC boosting circuits 1 and a capacitor 140. As shown in FIG. 12, the DC boosting circuit 1H is connected in parallel between the DC power supply 2 and the load 3. The DC boosting circuit 1H has a configuration employing an interleaving mode to reduce a ripple current of a voltage applied to the load 3 (e.g., the boosted voltage $V_2$) and ameliorate a corresponding loss.

The DC boosting circuit 1H includes boosting parts 10 and 10a and the capacitors 140 and 16. The boosting part 10 is connected in parallel between the DC power supply 2 and the load 3. The boosting part 10 includes the first arm pair 11, the second arm pair 12, the reactor 13, and the capacitor 15.

The boosting part 10a is connected in parallel between the DC power supply 2 and the load 3. Further, the boosting part 10a is connected in parallel to the boosting part 10. The boosting part 10a includes a first arm pair 11a, a second arm pair 12a, a reactor 13a, and a capacitor 15a. The boosting part 10a may have the same configuration as the boosting part 10.

The capacitor 140 is connected in parallel between the boosting part 10 and the boosting part 10a. For example, the capacitor 140 has one end connected to the cathodes of diodes 111 and 111a and another connected to the other ends of the switch elements 112_1 and 112a_1. When a plurality of DC boosting circuits 1 are used, the DC boosting circuit 1H may integrally employ one capacitor 140 to perform the roles of a plurality of the capacitors 14.

An example of the boosting operation of the DC boosting circuit 1H will now be described. The boosting operation of the DC boosting circuit 1H executes an interleaving operation for shifting a phase of an ON or OFF state of switch elements 112_1 and 112a_1. Accordingly, during a switching period of the DC boosting circuit 1H, the boosted voltage of the boosting part 10 and the boosted voltage of the boosting part 10a are alternately applied to the load 3. For example, a frequency of the detected ripple current is doubled with respect to the switching frequency of the DC boosting circuit 1H, and the ripple current decreases. The boosting operation of each of the boosting parts 10 and 10a of the DC boosting circuit 1H may be substantially the same as one or more previous embodiments.

As described above, the DC boosting circuit 1H according to the present exemplary embodiment includes a plurality of DC boosting circuits and the capacitor 140 integrally serving as the respective capacitors 14 thereof. The DC boosting circuit 1H executes each DC boosting circuit in the interleaving mode. Accordingly, a voltage applied to the first arm pair and the second arm pair may be determined as the voltage $V_2$ of the capacitor 16, that is lower than an output voltage of the DC boosting circuit 1H. Therefore, it may be advantageous that the load of a semiconductor (e.g., a switch element, a diode, or the like) is reduced, and an element having a low current capacity and a low withstand voltage may be employed. As a result, downsizing, weight saving, and cost reducing of a device having a high boosting ratio may be achieved.

Further, when a FET is employed as a semiconductor switch element, the ON resistance of the FET increases exponentially as its withstand voltage increases. Thus, power consumption of the FET increases as its withstand voltage increases. Accordingly, a leakage current of a DC boosting circuit is limited. Therefore, in the present exemplary embodiment, a semiconductor switch element having a low ON resistance may be employed.

Further, when executing the interleaving operation with a plurality of the DC boosting circuits, the DC boosting circuit 1H according to the present exemplary embodiment employs the capacitor 140 integrally serving as the capacitors 14 of the respective DC boosting circuits. As a result, further downsizing and cost reducing may be achieved.

Figure 13:
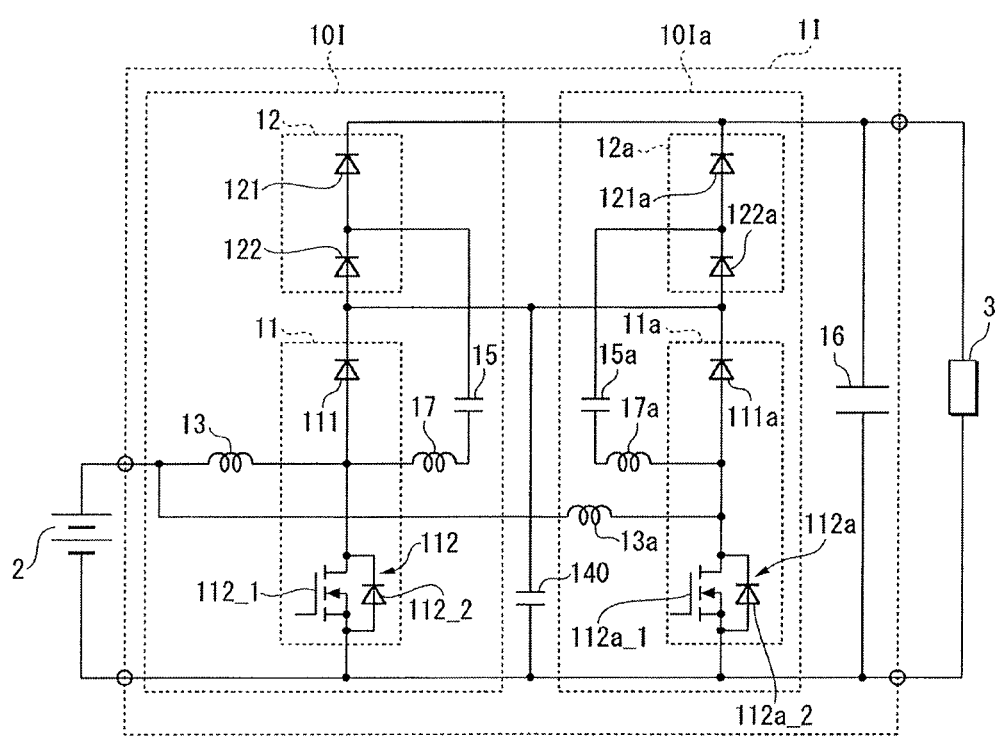
FIG. 13 illustrates another embodiment of a DC boosting circuit.

FIG. 13 illustrates another embodiment of a DC boosting circuit 1I which includes two DC boosting circuits 1A according to a previous embodiment and one capacitor 140 integrating roles of each capacitor 14 of the two DC boosting circuits 1A.

As shown in FIG. 13, the DC boosting circuit 1I is connected in parallel between the DC power supply 2 and the load 3. The DC boosting circuit 1I has a configuration employing an interleaving mode to reduce a ripple current of a voltage applied to the load 3, i.e., the boosted voltage $V_2$, and ameliorate a corresponding loss.

The DC boosting circuit 1I includes boosting parts 10I and 10Ia and the capacitors 140 and 16. The boosting part 10I is connected in parallel between the DC power supply 2 and the load 3. The boosting part 10I includes the first arm pair 11, the second arm pair 12, the reactor 13, the capacitor 15, and the reactor 17.

The boosting part 10Ia is connected in parallel between the DC power supply 2 and the load 3. Further, the boosting part 10Ia is connected in parallel to the boosting part 10I. The boosting part 10Ia includes the first arm pair 11a, the second arm pair 12a, the reactor 13a, the capacitor 15a, and a reactor 17a. The boosting part 10Ia may have the same configuration as the boosting part 10I.

An example of a boosting operation of the DC boosting circuit 1I according to the present exemplary embodiment will now be described. The boosting operation of the DC boosting circuit 1I executes an interleaving operation for shifting a phase of ON or OFF states of the switch elements 112_1 and 112a_1. Accordingly, during a switching period of the DC boosting circuit 1I, the boosted voltage of the boosting part 10I and the boosted voltage of the boosting part 10Ia are alternately applied to the load 3. For example, the frequency of the detected ripple current may be doubled with respect to the switching frequency of the DC boosting circuit 1I, and the ripple current decreases.

A boosting operation of each of the boosting parts 10I and 10Ia of the DC boosting circuit 1I may be substantially the same as one or more previous embodiments.

As described above, the DC boosting circuit 1I according to the present exemplary embodiment includes a plurality of DC boosting circuits according to a previous embodiment and the capacitor 140 integrally serving as the respective capacitors 14 thereof.

The DC boosting circuit 1I according to the present exemplary embodiment executes each DC boosting circuit in the interleaving mode. Accordingly, voltages applied to the first arm pair and the second arm pair may be determined as the voltage $V_2$ of the capacitor 16, that is lower than an output voltage of the DC boosting circuit 1I. Therefore, it may be advantageous that the load of a semiconductor (e.g., a switch element, a diode, or the like) is reduced, and an element having a low current capacity and a low withstand voltage may be employed. Therefore, downsizing, weight saving, and cost reducing of a device having a high boosting ratio may be achieved.

Further, when the FET is employed as a semiconductor switch element, the ON resistance of a FET increases exponentially as its withstand voltage increases. Thus, as the withstand voltage increases, power consumption of the FET problematically increases. Therefore, in the present exemplary embodiment, it is advantageous that a semiconductor switch element having a low ON resistance is employed.

Further, when executing the interleaving operation with a plurality of the DC boosting circuits, the DC boosting circuit 1I according to the present exemplary embodiment employs the capacitor 140 integrally serving as the respective capacitors 14 thereof. As a result, a further downsizing and cost reduction may be achieved.

Figure 14:
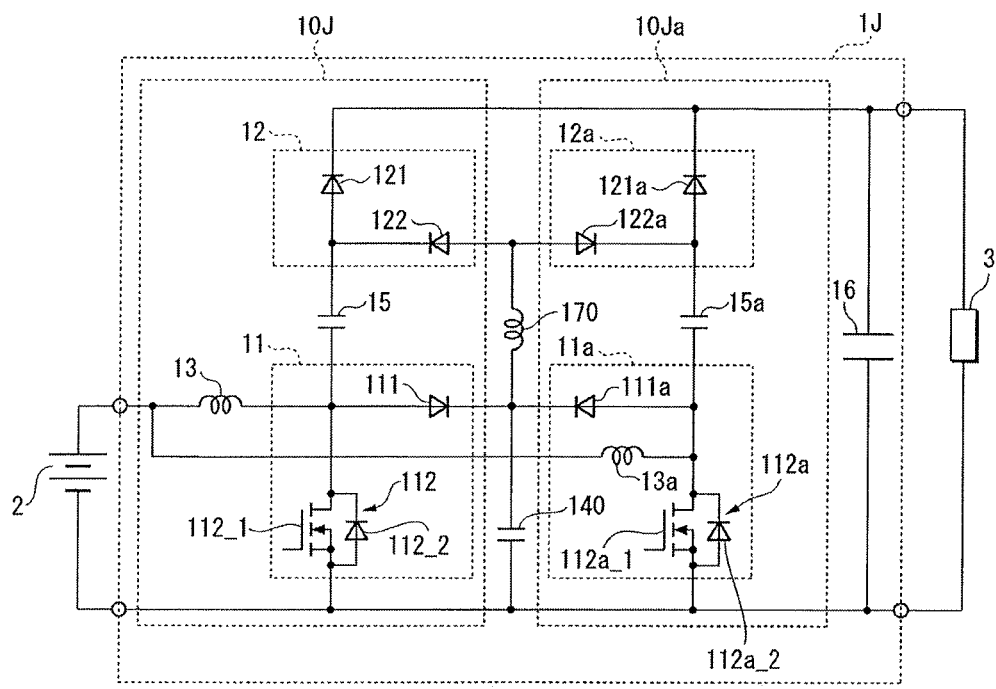
FIG. 14 illustrates another embodiment of a DC boosting circuit.

FIG. 14 illustrates an embodiment of a DC boosting circuit 1J which includes two DC boosting circuits 1B. The capacitors 14 of each DC boosting circuit 1B are substituted for one capacitor 140, and the reactors 17 of each DC boosting circuit 1B are substituted for one reactor 170.

As shown in FIG. 14, the DC boosting circuit 1J is connected in parallel between the DC power supply 2 and the load 3. The DC boosting circuit IT has a configuration employing an interleaving mode to reduce a ripple current of a voltage applied to the load 3 (e.g., the boosted voltage $V_2$) and ameliorate a corresponding loss.

The DC boosting circuit 1J includes boosting parts 10J and 10Ja, the capacitor 140, the reactor 170, and the capacitor 16. The boosting part 10J is connected in parallel between the DC power supply 2 and the load 3. The boosting part 10J includes the first arm pair 11, the second arm pair 12, the reactor 13, and the capacitor 15.

The boosting part 10Ja is connected in parallel between the DC power supply 2 and the load 3. Further, the boosting part 10Ja is connected in parallel to the boosting part 10J. The boosting part 10Ja includes the first arm pair 11a, the second arm pair 12a, the reactor 13a, and the capacitor 15a. The boosting part 10Ja may have the same configuration as that of the boosting part 10J.

The reactor 170 is connected in parallel between the boosting parts 10J and 10Ja. For example, the reactor 170 has one end connected to the anodes of diodes 122 and 122a and another end connected to the cathodes of the diodes 111 and 111a.

Hence, when a plurality of DC boosting circuits 1B are used, the DC boosting circuit 1J may use one capacitor 140 integrally for performing the roles of a plurality of the capacitors 14. Further, roles of a plurality of the reactors 17 may be served integrally by one rector 170.

An example of a boosting operation of the DC boosting circuit 1J according to the present exemplary embodiment will now be described. The boosting operation of the DC boosting circuit 1J executes an interleaving operation for shifting a phase of an ON or OFF state of the switch elements 112_1 and 112a_1.

Accordingly, during a switching period of the DC boosting circuit 1J, the boosted voltage of the boosting part 10J and the boosted voltage of the boosting part 10Ja are alternately applied to the load 3. For example, the frequency of the detected ripple current is doubled with respect to the switching frequency of the DC boosting circuit 1J, and the ripple current decreases. A boosting operation of each of the boosting parts 10J and 10Ja of the DC boosting circuit 1J may be substantially the same as one or more previous embodiments.

As described above, the DC boosting circuit 1J according to the present exemplary embodiment includes a plurality of the DC boosting circuits and the capacitor 140 jointly serving as each capacitor 14 thereof.

Further, the DC boosting circuit 1J according to the present exemplary embodiment includes the reactor 170 integrally serving as the reactor 17 of the respective DC boosting circuits.

The DC boosting circuit 1J according to the present exemplary embodiment executes each DC boosting circuit in the interleaving mode. Accordingly, a voltage applied to the first arm pair and the second arm pair may be determined as the voltage $V_2$ of the capacitor 16, that is lower than an output voltage of the DC boosting circuit 1J. Therefore, it may be advantageous that the load of a semiconductor (e.g., a switch element, a diode, or the like) is reduced, and an element having a low current capacity and a low withstand voltage may be employed. As a result, downsizing, weight saving, and cost reducing of a device having a high boosting ratio may be achieved.

Further, when a FET is employed as a semiconductor switch element, the ON resistance of a FET increases exponentially as its withstand voltage increases. Thus, since power consumption of the FET increases as its withstand voltage increases, a leakage current of a DC boosting circuit is limited. Therefore, in the present exemplary embodiment, a semiconductor switch element having low ON resistance may be employed.

Further, when executing the interleaving operation with a plurality of the DC boosting circuits, the DC boosting circuit 1J according to the present exemplary embodiment employs the capacitor 140 and the reactor 140 integrally serving as the capacitor 14 and the reactor 17 of the respective DC boosting circuits. As a result, more downsizing and cost reduction may be achieved.

Figure 15:
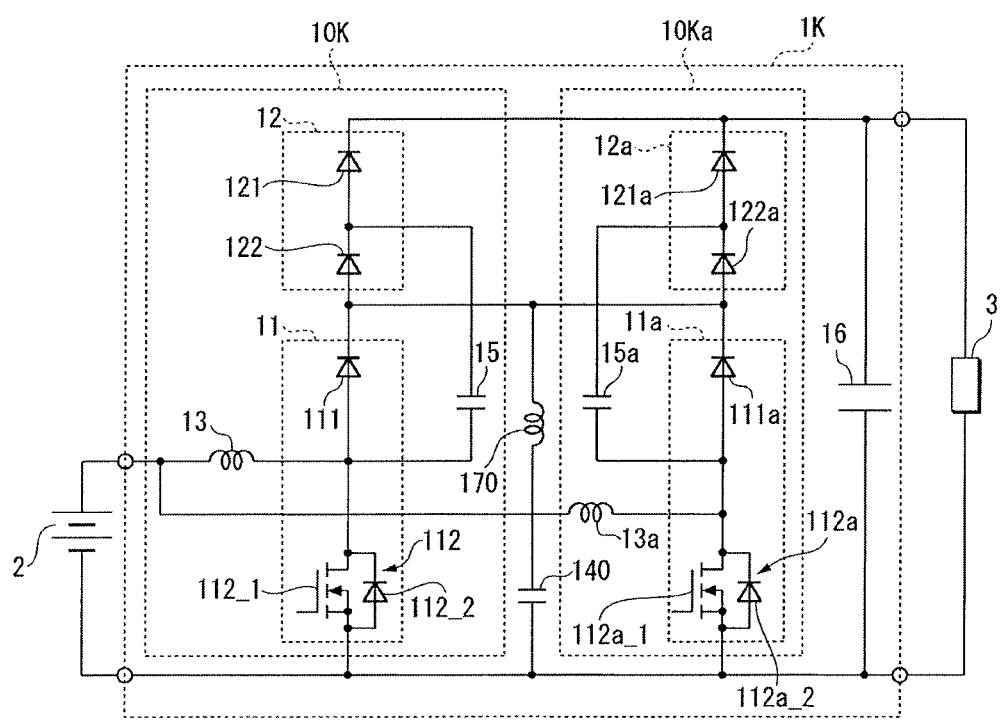
FIG. 15 illustrates another embodiment of a DC boosting circuit.

FIG. 15 illustrates another embodiment of a DC boosting circuit 1K which includes two DC boosting circuits 1C according to a previous embodiment, one capacitor 140 integrating roles of each capacitor 14 of the two DC boosting circuits 1C, and one reactor 170 integrating roles of each reactor 17 of the two DC boosting circuits 1C.

As shown in FIG. 15, the DC boosting circuit 1K is connected in parallel between the DC power supply 2 and the load 3. The DC boosting circuit 1K has a configuration employing an interleaving mode to reduce a ripple current of a voltage applied to the load 3 (e.g., the boosted voltage $V_2$) and ameliorate a corresponding loss.

The DC boosting circuit 1K includes boosting parts 10K and 10Ka, the capacitor 140, the reactor 170, and the capacitor 16. The boosting part 10K is connected in parallel between the DC power supply 2 and the load 3. The boosting part 10K includes the first arm pair 11, the second arm pair 12, the reactor 13, and the capacitor 15.

The boosting part 10Ka is connected in parallel between the DC power supply 2 and the load 3. Further, the boosting part 10Ka is connected in parallel to the boosting part 10K. The boosting part 10Ka includes the first arm pair 11a, the second arm pair 12a, the reactor 13a, and the capacitor 15a. The boosting part 10Ka may have the same configuration as the boosting part 10K.

The reactor 170 is connected in parallel between the boosting parts 10K and 10Ka. For example, the reactor 170 has one end connected to the anodes of the diodes 122 and 122a and another end connected to one end of the capacitor 140.

Hence, when a plurality of DC boosting circuits 1C are used, the DC boosting circuit 1K may use one capacitor 140 integrally for roles of a plurality of the capacitors 14. Further, roles of a plurality of the reactors 17 are served jointly by one reactor 170.

An example of a boosting operation of the DC boosting circuit 1K according to the present exemplary embodiment will now be described. The boosting operation of the DC boosting circuit 1K executes an interleaving operation for shifting a phase of an ON or OFF state of the switch elements 112_1 and 112a_1. Accordingly, during a switching period of the DC boosting circuit 1K, the boosted voltage of the boosting part 10K and the boosted voltage of the boosting part 10Ka are alternately applied to the load 3. For example, the frequency of the detected ripple current may be doubled with respect to the switching frequency of the DC boosting circuit 1K and the ripple current decreases. A boosting operation of each of the boosting parts 10K and 10Ka of the DC boosting circuit 1K may be substantially the same as a previous embodiment.

As described above, the DC boosting circuit 1K according to the present exemplary embodiment includes a plurality of the DC boosting circuits according to a previous embodiment and the capacitor 140 jointly serving as each capacitor 14 thereof.

Further, the DC boosting circuit 1K according to the present exemplary embodiment includes the reactor 170 integrally serving as the reactor 17 of the respective DC boosting circuits. Then, the DC boosting circuit 1K according to the present exemplary embodiment executes each DC boosting circuit in the interleaving mode. Accordingly, a voltage applied to the first arm pair and the second arm pair may be determined as the voltage $V_2$ of the capacitor 16, that is lower than an output voltage of the DC boosting circuit 1K. Therefore, it may be advantageous that the load of a semiconductor (e.g., a switch element, a diode, or the like) is reduced, and an element having a low current capacity and a low withstand voltage may be employed. As a result, downsizing, weight saving, and cost reducing of a device having a high boosting ratio may be achieved.

Further, when a FET is employed as a semiconductor switch element, the ON resistance of a FET increases exponentially as its withstand voltage increases. Thus, since power consumption of the FET increases as its withstand voltage increases, a leakage current of a DC boosting circuit is limited. Therefore, in the present exemplary embodiment, a semiconductor switch element having a low ON resistance may be employed.

Further, when executing the interleaving operation with a plurality of the DC boosting circuits, the DC boosting circuit 1K according to the present exemplary embodiment employs the capacitor 140 and the reactor 140 integrally serving as the capacitor 14 and the reactor 17 of the respective DC boosting circuits. As a result, more downsizing and cost reduction may be achieved.

By way of summation and review, one type of DC boosting circuit (called a boosting chopper circuit) includes a switching element, a diode, and a reactor. An example of such a circuit is illustrated in FIG. 16.

Figure 16:
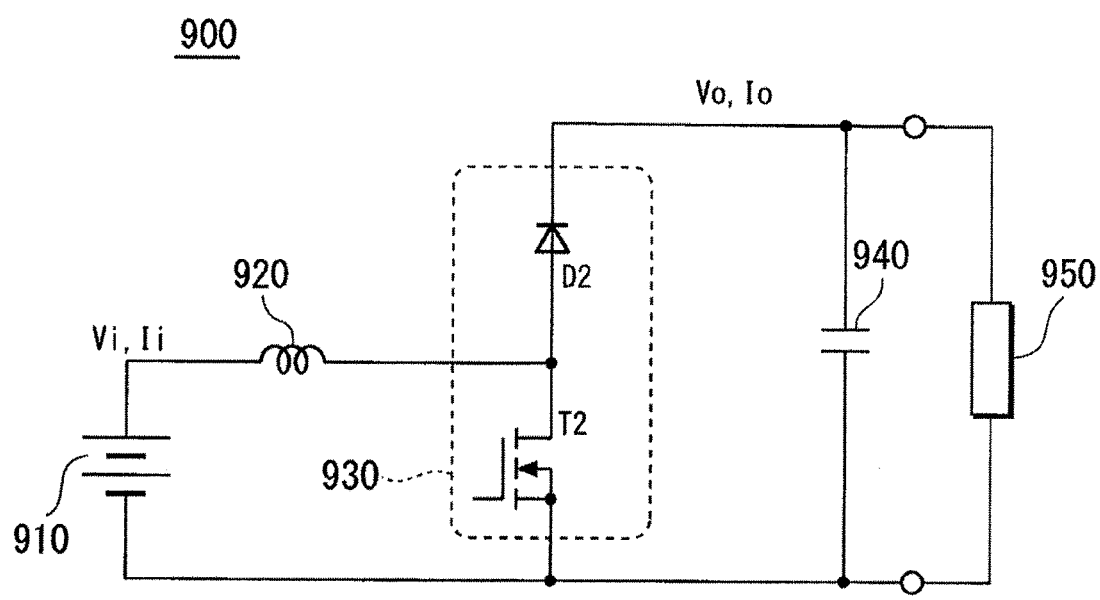
FIG. 16 illustrates another type of DC boosting circuit.

Referring to FIG. 16, the DC boosting circuit 900 includes a DC power supply 910, a reactor 920, an arm pair 930, a capacitor 940, and a load 950. The arm pair 930 includes a diode D2 and a semiconductor switch element (e.g., MOSFET) T2. The reactor 920 is connected between a node of the diode D2 and the semiconductor switch element T2, and a positive terminal of the DC power supply 910. A negative terminal of the DC power supply 910 is connected to an outer terminal (source of MOSFET) of the arm pair 930. Further, the capacitor 940 and the load 950 are connected in parallel to opposite ends of the arm pair 930.

When the switch element T2 is in an ON state, the DC boosting circuit 900 has a current path including the DC power supply 910, the reactor 920, the switch element T2, and the DC power supply 910, and energy is accumulated in the reactor 920.

When the switch element T2 is turned off, a current flowing in the switch element T2 flows along a path including the diode D2 and the capacitor 940. Due to the accumulated energy of the reactor 920, the capacitor 940 is charged to a voltage that is higher than the voltage of the DC power supply 910.

Accordingly, by repeating ON and OFF states of the switch element T2, the DC boosting circuit 900 boosts a voltage and supplies the boosted voltage that is higher than the voltage of the DC power supply 910 to the load 950.

A relationship between a voltage $V_i$ and a current $I_i$ of the DC power supply 910, and a voltage $V_O$ and a current $I_O$ supplied to the load 950, assuming that the DC boosting circuit 900 is ideal, satisfies a relationship of $V_i{}^*I_i=V_O{}^*I_O$ (=transformed electric power). Alternatively, the relationship may be presented by $V_i{:}V_O=I_O{:}I_i$. Therefore, in the case of a high boosting ratio $V_O/V_i$, the voltage $V_O$ and the current $I_i$ are high, the transformed electric power remains constant.

As a result, the switch element T2 and the diode D2 need to be designed to correspond to a high-voltage current capacity (electric power) with a high boosting ratio. Therefore, when physically implementing the device, problems of increasing size and raising cost are inevitable.

In accordance with one or more of the aforementioned embodiments, the load of a semiconductor (e.g., a switch element, a diode, or the like) is reduced and an element having a low current capacity and a low withstand voltage may be employed. As a result, downsizing, weight saving, and cost reducing of a device having a high boosting ratio may be achieved.

Further, when a FET is employed as a semiconductor switch element, the ON resistance of the FET increases exponentially as its withstand voltage increases. Thus, power consumption of the FET increases as its withstand voltage increases. Accordingly, leakage current of the DC boosting circuit is limited. Therefore, in the present exemplary embodiment, a semiconductor switch element having a low ON resistance may be employed.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise indicated. Accordingly, it will be understood by those of skill in the art that various changes in form and details may be made without departing from the spirit and scope of the invention as set forth in the following claims.

What is claimed is:

1. A DC boosting circuit, comprising:
a first switch having a first end connected to a first node;
a first diode has a first end connected to the first node and a second end connected to a second node;
a first reactor having a first end connected to the first node and a second end connected to a DC power supply;
a first capacitor having a first end connected to a second end of the first switch and a second end connected to the second node;
a second diode having a first end connected to the second node and a second end connected to a third node;
a third diode having a first end connected to the third node and a second end connected to an output terminal to output a boosted voltage of the DC power supply;
a second capacitor having a first end connected to the first node and a second end connected to the third node, and wherein the second capacitor has a same electrical potential as the first capacitor when the first switch is turned on, wherein the third diode is connected between the second node and the output terminal.

2. The circuit as claimed in claim 1, further comprising:
a second switch connected in parallel to the first diode;
a third switch connected in parallel to the second diode; and
a fourth switch connected in parallel to the third diode.

3. The circuit as claimed in claim 1, further comprising:
a second reactor between the first end of the first reactor and the first end of the second capacitor.

4. The circuit as claimed in claim 3, further comprising:
a plurality of DC boosting circuits that share the first capacitor and the second reactor.

5. The circuit as claimed in claim 3, wherein the first and second reactors are wound around a same iron core.

6. The circuit as claimed in claim 1, further comprising:
a plurality of DC boosting circuits that share the first capacitor.

7. The circuit as claimed in claim 6, wherein the DC boosting circuits are to be operated in an interleaving mode.

8. A boosting circuit, comprising:
a first circuit including a first element and a second element;
a second circuit including the first element and a third element; and
a switch connected to the first circuit and the second circuit,
wherein the first element and the second element are to store energy based on an input voltage when the switch is in a first state, and the third element is to store energy from the second element when the switch is in a second state, wherein the second circuit is to output a voltage greater than the input voltage, and wherein each of the first element, the second element, and the third element is a reactor or a capacitor, and wherein the third element has a same electrical potential as the second element when the switch is in the second state, wherein the first state is an off state of the switch and the second state is an on state of the switch.

9. The circuit as claimed in claim 8, further comprising:
a fourth element in the second circuit,
wherein the fourth element is to store energy from the first element when the switch is in the first state and wherein the fourth element is a capacitor or reactor.

10. The circuit as claimed in claim 9, wherein the fourth element is to store energy from the second element when the switch is in the second state and is to store energy from the first element when the switch is in the first state.

11. The circuit as claimed in claim 10, wherein the fourth element is to store energy along a path which includes the second element and the third element when the switch is in the second state.

12. The circuit as claimed in claim 11, wherein the third element is to store energy from the second element when the switch is in the second state.

13. The circuit as claimed in claim 8, wherein the voltage to be output from the second circuit is based on a sum of the energy from the first element and the energy from the third element.

14. The circuit as claimed in claim 9, wherein the switch is connected to the first element, the second element, and the fourth element.

* * * * *